(12) United States Patent
Kumar

(10) Patent No.: US 10,999,268 B2
(45) Date of Patent: May 4, 2021

(54) SYSTEM AND METHOD FOR ELECTRONIC CREDENTIALS

(71) Applicant: Tango Mobile, LLC, Marina Del Ray, CA (US)

(72) Inventor: Himalesh Cherukuvada Kumar, Marina Del Ray, CA (US)

(73) Assignee: CORT Business Services Corporation, Chantilly, VA (US)

( * ) Notice: Subject to any disclaimer, the term of this patent is extended or adjusted under 35 U.S.C. 154(b) by 0 days.

(21) Appl. No.: 16/456,906

(22) Filed: Jun. 28, 2019

(65) Prior Publication Data

US 2019/0319944 A1 Oct. 17, 2019

Related U.S. Application Data

(63) Continuation of application No. 14/421,005, filed as application No. PCT/US2013/054766 on Aug. 13, 2013, now abandoned.

(60) Provisional application No. 61/779,237, filed on Mar. 13, 2013, provisional application No. 61/753,561, filed on Jan. 17, 2013, provisional application No. 61/683,954, filed on Aug. 16, 2012.

(51) Int. Cl.
*H04L 29/06* (2006.01)
*G06F 21/33* (2013.01)

(52) U.S. Cl.
CPC .......... *H04L 63/0823* (2013.01); *G06F 21/33* (2013.01)

(58) Field of Classification Search
CPC ............................ H04L 63/0823; G06F 21/33
See application file for complete search history.

(56) References Cited

U.S. PATENT DOCUMENTS

| | | |
|---|---|---|
| 6,516,414 B1 | 2/2003 | Zhang |
| 6,938,019 B1 | 8/2005 | Uzo |
| 7,000,116 B2 | 2/2006 | Bates et al. |
| 7,860,753 B2 | 12/2010 | Walker et al. |
| 7,904,344 B2 | 3/2011 | Philyaw |
| 8,032,927 B2 | 10/2011 | Ross |
| 8,170,527 B2 | 5/2012 | Granucci et al. |
| 8,666,763 B2 | 3/2014 | Fabius |
| 2002/0083178 A1 | 6/2002 | Brothers |
| 2002/0156879 A1* | 10/2002 | Delany ............... H04L 67/2852 709/223 |
| 2003/0014372 A1 | 1/2003 | Wheeler et al. |
| 2003/0159032 A1 | 8/2003 | Gerck |
| 2006/0165060 A1 | 7/2006 | Dua |
| 2006/0173794 A1 | 8/2006 | Sellars et al. |
| 2007/0255662 A1 | 11/2007 | Tumminaro |

(Continued)

OTHER PUBLICATIONS

CGI, Public Key Encryption and Digital Signatures: How do they work?, 2004, CGI, White Paper, pp. 8-10.

(Continued)

*Primary Examiner* — Alexander Lagor
*Assistant Examiner* — William B Jones
(74) *Attorney, Agent, or Firm* — Duane Morris LLP

(57) ABSTRACT

The present disclosure describes systems and methods directed towards a highly secure and intelligent, end to end provisioning, authentication, and transaction system which creates and/or consolidates user data for a unified profile for the user (e.g., a person, place, organization, object, etc.) to allow for the safe, secure, and verifiable exchange of information.

16 Claims, 24 Drawing Sheets

(56) References Cited

U.S. PATENT DOCUMENTS

| | | |
|---|---|---|
| 2008/0052514 A1 | 2/2008 | Nakae |
| 2008/0189360 A1 | 8/2008 | Kiley et al. |
| 2008/0208743 A1* | 8/2008 | Arthur ................ G06Q 20/105 705/41 |
| 2009/0119190 A1 | 5/2009 | Realini |
| 2009/0132813 A1 | 5/2009 | Schibuk |
| 2009/0260064 A1 | 10/2009 | McDowell et al. |
| 2010/0257189 A1 | 10/2010 | Campbell |
| 2011/0072274 A1 | 3/2011 | Leoutsarakos et al. |
| 2011/0087877 A1* | 4/2011 | Dagg ................... H04L 63/062 713/150 |
| 2011/0289001 A1 | 11/2011 | Bishop et al. |
| 2012/0030366 A1 | 2/2012 | Collart et al. |
| 2012/0054841 A1 | 3/2012 | Schultz et al. |
| 2012/0078752 A1 | 3/2012 | Hultberg et al. |
| 2012/0084131 A1 | 4/2012 | Bergel et al. |
| 2012/0089469 A1 | 4/2012 | Bonalle et al. |
| 2012/0116959 A1 | 5/2012 | Pitroda et al. |
| 2012/0130904 A1 | 5/2012 | Weiss |
| 2012/0150742 A1 | 6/2012 | Poon et al. |
| 2012/0150748 A1 | 6/2012 | Law et al. |
| 2012/0150750 A1 | 6/2012 | Law et al. |
| 2012/0158589 A1 | 6/2012 | Katzin et al. |
| 2012/0185398 A1 | 7/2012 | Weis et al. |
| 2012/0198241 A1 | 8/2012 | O'Hare et al. |
| 2013/0030854 A1 | 1/2013 | McCormack |
| 2016/0182319 A1* | 6/2016 | Martin ................ H04L 63/0823 370/241 |

OTHER PUBLICATIONS

International Searching Authority, International Search Report for corresponding application PCT/US2013/054766 dated Mar. 18, 2014, 1 pg.

International Searching Authority, International Search Report for corresponding application PCT/US2013/054759 dated Feb. 27, 2014, 2 pgs.

International Searching Authority, International Search Report for corresponding application PCT/US2013/054769 dated Dec. 6, 2013, 1 pg.

* cited by examiner

SYSTEM AND METHOD FOR ELECTRONIC CREDENTIALS

RELATED AND CO-PENDING APPLICATIONS

This application is a continuation of U.S. application Ser. No. 14/421,005 filed 11 Feb. 2015 entitled "System and Method for Electronic Credentials" which is a U.S. national stage application of and claims priority to PCT application Serial Number PCT/US2013/054766 entitled "System and Method for Electronic Credentials" filed 13 Aug. 2013 which claims priority to each of the following U.S. provisional applications: "System and Method for a Secure Mobile Application", Ser. No. 61/683,954 filed 16 Aug. 2012; "System and Method for a Secure Transactional Platform", Ser. No. 61/753,561 filed 17 Jan. 2013; and "System and Method for Mobile Credentials and Transactions", Ser. No. 61/779,237 filed 13 Mar. 2013, the entirety of each of the above applications is hereby incorporated herein by reference.

This application hereby incorporates by reference the entirety of each of the following two applications which are filed concurrently herewith: U.S. national stage application Ser. No. 14/421,013 filed 11 Feb. 2015 entitled "System and Method for Secure Transactions" which is a U.S. national stage application of PCT application Ser. No. PCT/US2013/054759 filed 13 Aug. 2013 entitled "System and Method for Secure Transactions"; and U.S. national stage application Ser. No. 14/420,996 filed 11 Feb. 2015 entitled "System and Method for Mobile or Web-Based Payment/Credential Process" which is a U.S. national stage application of PCT application Ser. No. PCT/US2013/054769 filed 13 Aug. 2013 entitled "System and Method for Mobile or Web-Based Payment/Credential Process".

BACKGROUND

Current systems and methods incorporating traditional identification documents and/or credentials (referred to herein as, "ID") include a set of defined relationships between certain persons/entities that delineate particular expectations amongst the certain persons/entities. These expectations may include, but are not limited to, such things as identification, verification, access, rights, privileges, payments, debits, credits, etc. between at least two of the owner of the ID, the issuer of the ID, and one who is inspecting the ID to verify the owner's proper status/qualifications/certification.

As a simple example, a traditional ID such as a driver's license is issued by an appropriate state department of motor vehicles ("DMV") to a driver once the driver, typically, has met the DMV's requirements. Therefore, the DMV is satisfied of the driver's identity and qualifications and the driver is presented with the license to use as a token of the DMV's confidence in the driver's identity and qualifications. The driver may then use the driver's license to identify himself to a third party to verify, for example, the driver's age with the expectation that the verifying party will accept the license and accept that the information contained thereon is not false. The verifying party, upon inspection of the driver's license, will acknowledge that the driver's license is legitimate and that the driver proffering the license is the age represented by the birth date on the driver's license. Thus, the DMV, the driver, and the verifying party can satisfactorily rely upon the token (driver's license) as an authoritative and true representation of the information carried thereon. While the traditional document token system is useful for a limited set of conventional transaction types, the traditional document token system is becoming outmoded in the digital information age and cannot be effectively used for novel secure transactions and other innovative purposes, such as, for example, transactions that require user identification from a distance.

Current electronic ID systems and methods employ essentially the same type of process as that described above with an ID issuer, and ID owner, and an ID verifying party. The only difference is that the ID is electronic rather than a physical token. Due to the spate of computer hacking, identification theft, and other electronic scams, the current electronic ID systems are vulnerable to attack and unauthorized manipulation. Thus, current electronic ID systems and methods suffer similar limitations as the traditional document token systems and cannot be effectively used for more innovative purposes. Furthermore, current electronic ID systems have suffered a concomitant loss of consumer confidence in the accuracy and reliability of the electronic IDs.

Accordingly, there is a need for secure, reliable, and accurate electronic ID systems and methods that meet current consumer needs as well as the demands of novel identification techniques, secure transactions, and usages for the future.

DETAILED DESCRIPTION

Figure 1:
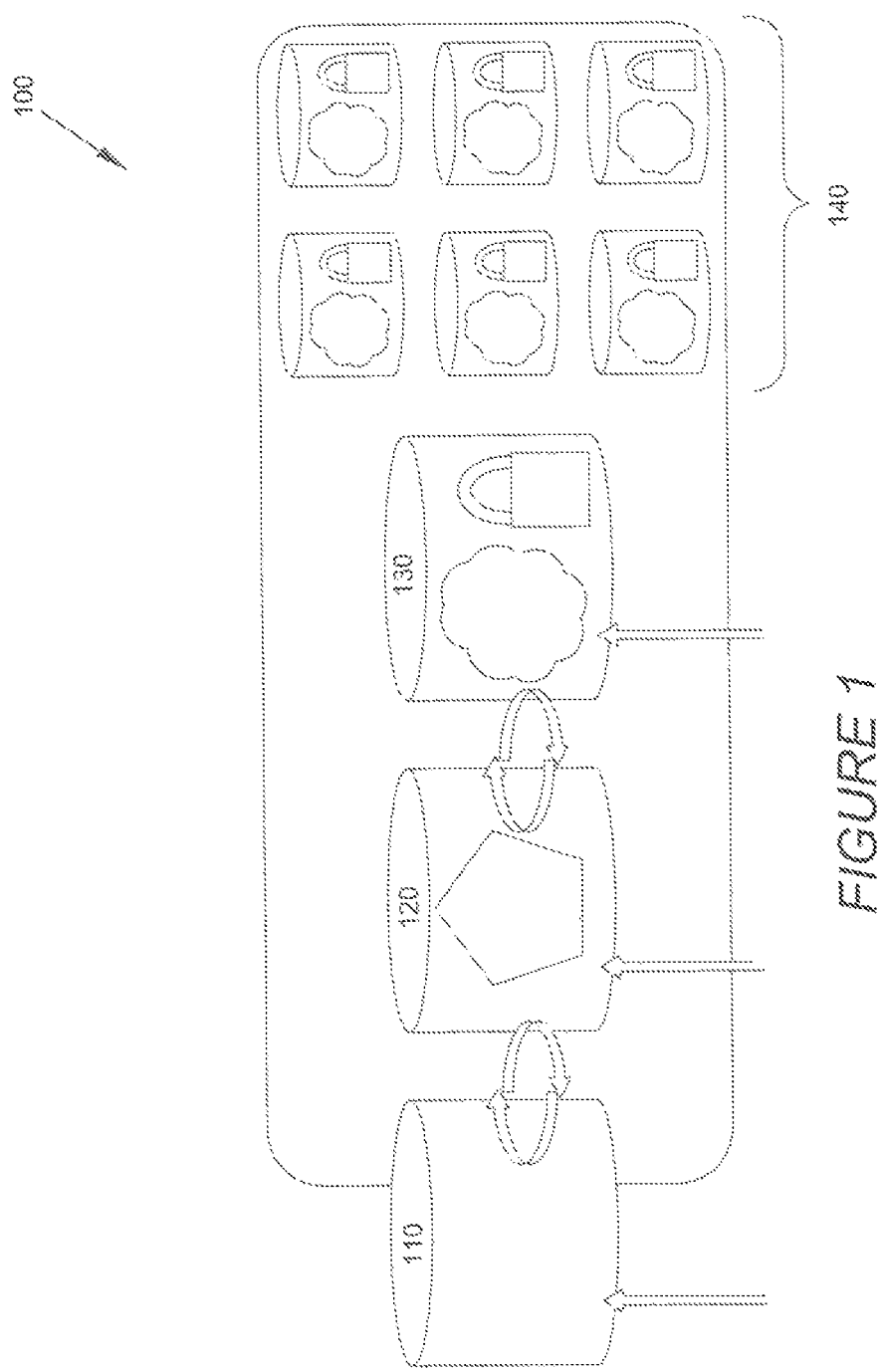
FIG. 1 is a block diagram of a secure data/credential storage system according to an embodiment of the present subject matter.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific systems and methods of electronic identification and secure transactions, it is to be understood that the discussion is not intended to limit the scope of the present subject matter in any way and that the principles presented are equally applicable to other systems and method of electronic identification and secure transactions.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for secure transactions are described.

Embodiments of the present system and method described herein are directed towards a highly secure and intelligent, end to end provisioning and authentication system (sometimes referred to herein as the "Tango Secure Environment" or "TSE"). The TSE is typically organized, set up, initiated, and operated by a TSE Authority. Embodiments of the system and method are useful to achieve, among other things, the following tasks: interactions with people, places, organizations, and/or objects to verify their identity/credentials accurately; create and/or consolidate data for a unified profile for the person, place, organization, and/or object; allow for safe/accurate exchange of information between profiles for use within the system and with other systems; and increase current levels of verification and security.

In certain embodiments, the present disclosure incorporates different levels of data that are absorbed and/or used/passed through during an exchange or verification of data. For example, the present disclosure uses Identifiers that are composed of data that is collected and/or created by the system and stored in the users' profile on the system database (sometimes referred to herein as the "Tango Secure Database" or "TSDB") to accurately identify a user to fulfill a system process. The Identifiers may be derived and/or tokenized from user-unique information and may be created by using a hash function or other one-way function as is known in the art. Identifiers may include confidential data of the user such as, but not limited to, information from one or more of the following:

Issued IDs—physical IDs issued by another party such as driver's license, passport, library cards, etc.;

Non-Physical IDs—virtual credentials such as username/password, email, PIN, etc.;

Financial Data—financial credentials and account information for credit card, rewards card, bank account, gift card, etc.;

Keys—physical and/or virtual credentials utilized by a third party to grant access;

Other—all other data known and unknown which may uniquely identify a user independently or collectively such as social security number, date of birth, home address, picture, biometric data, etc.

Since an electronic ID typically not only encompasses one ID and/or Credential to one user, and since the issuer of the ID/Credential may not want to manage electronic dissemination of those IDs, and since there must be a provisioning of the ID(s)/Credential(s) to the user, there must be a trusted service manager (e.g., the "TSE Authority") to act as the "provisioner" and manager of all ID/Credentials of one user. This creates a Universal Electronic ID system that allows the user to securely manage all ID/Credentials they may own, under one electronic ID account. The account manager (e.g., TSE Authority) would act as a manager to securely store and/or provision any of the user's approved electronic devices(s) and/or third party electronic device(s) with the ID/Credentials, as well as be the clearing house between the credential issuer, the user, and any party that is requesting the legitimacy, authority, and/or sovereignty of the ID/Credential.

It is important to note that, as used herein, using an electronic ID/Credential encompasses more than simply placing an ID on a user's mobile device and/or any electronic system, or issuing an ID for placement onto a user's mobile device and/or any electronic system, but rather embodiments of the disclosed system and method include a complex connection and communication of electronic systems coming together to display sovereign issuance of ID/Credentials, prove Identity, ownership, and/or authority for a person, place, or thing. In doing so, the outcome allows the person, place, or thing that proved/verified its identity and/or ownership to engage and benefit from services and/or products of some kind offered by the party that requested the user's proof of identity and/or ownership.

In certain embodiments, functions of the disclosed system and method may been seen as somewhat similar to that of an issued or created identification of a person, place, or thing by a valid issuer such as, but not limited to, drivers licenses, passports etc. However, the novel electronic ID/credential system and methods discussed herein are not only an electronic version of the same static physical ID document(s) which holds some of the same data, but also possess dynamic properties due to the inherent and/or designed-in technological capabilities. Some of these properties are, but not limited to, securely provisioning the IDs remotely in various ways, renewing an ID/credential, remotely issuing and/or revoking an ID/credential, etc.

In addition to physical ID document(s), in certain embodiments, electronic ID/credentials also act as "digital keys" that give the correct credentials of a person, place, or thing to allow access to various access-controlled environments such as, but not limited to, home, cars, buildings, etc. Moreover, electronic ID/credential systems may also encompass credentials that may or may not be physical in nature, but also allow a person, place or thing to access protected products and services such as websites, e-mail accounts, bank account(s), computers, etc.

The electronic ID/credential system described herein not only includes physical/non-tangible IDs and credentials, it also stores any data of any kind associated to a particular person, place, or thing. In certain embodiments, the novel system and method stores tokens and other data that, although may not reveal an identification of a person, may reveal an identification of a person's accounts. The novel system and method may also store payment accounts such as, but not limited to, credit cards, charge cards, gift cards, bank accounts, PayPal accounts, etc., as well as other closed-looped or open-looped payment schemes that identify a user's account(s).

In certain embodiments, the present disclosure uses Response Data which includes all data types that may be given by the TSE to fulfill a TSE process. Response Data may include information from one or more of the following:

Actual Data—actual data includes that data which would simply be the pass through of unaltered Identifiers from the TSDB to necessary connections;

Universal ID (also referred to as User Unique ID or User Universal ID)—this is a TSE-created unique code (e.g., number);

Tokenized Data—this includes Actual Data input into the system and manipulated to put the Actual Data in a series of indexes to thereby create a unique number that does not contain the Actual Data;

Derivative Data—this includes Actual Data input into the system and manipulated to put Actual Data through a series of algorithms (e.g., hashing algorithms that take the Actual Data and Universal ID as inputs) to create new Identifiers;

Certificate ID—this contains information regarding a particular transaction which is currently taking place or has taken place in order to provision a certain data set with the appropriate entity, it is provided to certain entities to provide a higher level of authentication;

In certain embodiments, Actual Data (e.g., the actual ID/credential of a user and/or the user's data) may not be held by the user's mobile device. Depending on the specific need and the user's desire, all actual data can be accessed and sent to the user's mobile device when needed, with proper authentication. This data may or may not be encrypted on the mobile device. If the user wishes, the Actual Data can be given to a third party in any manner the user sees fit. The TSE Authority may be the manager and digital issuer of the data, however the user is the owner of the data and the TSE is designed only to assist the user in handling the data and in making the process of storage and provisioning the user's data safe, secure, verifiable, and fast.

In certain embodiments, each user will be given a unique Electronic/Digital ID identifier, the Universal ID, once the user registers with the TSE. This unique Identifier will be linked to the user's account(s). All ID/Credential and user data (e.g., Actual Data) will be linked to the unique ID identifier for that user and their account. As a non-limiting example, if a third party requests certain data from the user, the third party will connect to the TSDB and provide the TSDB with its third party ID, the user's unique Electronic/Digital ID, and the type of data being requested. If the transaction is approved and authorized, the TSDB will pull up the requested data and complete the transaction with the third party.

In certain embodiments, the TSDB can also tokenize and/or encrypt some or all ID/Credential data on the TSDB and/or the TSE and/or the user's mobile device. In doing so, the TSDB and/or TSE will create a token and/or public key(s) which will identify the user and the Actual Data on the TSDB and/or TSE. This may be accomplished by taking the Actual Data and tokenizing the Actual data by placing it into an algorithm (e.g., hashing algorithm).

In certain embodiments, the TSDB and/or TSE may also create and/or issue Derivative Data, where Derivative Data is a derivative of the ID/Credential(s) (i.e., not a token based system as described above). As a non-limiting example, Derivative Data is created by taking the Actual Data and the User Universal ID and placing both into an algorithm (e.g., hashing algorithm) One purpose of creating Derivative Data, among other reasons, would be to use the ID/Credentials while at the same time protecting the sensitive root data of the ID/Credential itself. If needed, the TSDB and/or TSE can create an unlimited number of unique derivative IDs for the same ID/Credential (which may be referred to herein as Multiple Unique Derivative IDs). As a non-limiting example, Multiple Unique Derivative IDs may be created by taking the Actual Data, the User Universal ID and the third party ID (which is typically unique for each separate third party) and placing each into an algorithm Thus, a unique derivative ID is created for each separate third party based on the same root data (e.g., the same Actual Data and User Universal ID). In this way (and only if needed), all approved third parties will be given a unique derivative ID number of the same user ID/Credential saved on the TSDB and/or TSE. By doing so, the Multiple Unique Derivative ID will display the user, ID/Credential Data, and the third party to whom the Multiple Unique Derivative ID was issued. Therefore, each third party is provided with a unique derivative ID for the same ID/Credential of the user, and, consequently, third parties cannot share user data. This scheme also prevents authorized parties from deciphering user data without first acquiring approval from the TSDB and/or TSE. Moreover, if necessary a particular multiple derivative ID can be connected to the specific third party.

In certain embodiments, in addition to the user unique ID identifier, tokens, derivative, Multiple Unique Derivative ID, and the actual ID/Credential data on the TSDB and/or the TSE, the TSDB and/or TSE (specifically, in an embodiment, the TIS) may issue an Electronic/Digital Issuance Certificate ID. This Electronic/Digital Issuance Certificate ID is not part of the root data itself (e.g., a driver's license number, or token of the driver's license created by the TSE and/or TSDB), but rather the Electronic/Digital Issuance Certificate ID is a unique identifying code/number that was created to provided authenticity and reference of the root ID/Credential documentation from the issuer, trusted digital manager, and/or user account to which it was provisioned as well as to the user. This number is given to prove that the TSE and/or TSDB has provisioned and/or created a digital copy and can be viewed as a digital finger print of sorts of the ID/Credentials and user data.

In certain embodiments, the present disclosure uses one or more of various Response Types. Response Types are the responses the TSE will provide to entities. The requester of information will also have a TSE profile which contains stored procedures allowed for that requester by the TSE. Response Types may include information from one or more of the following:

Authorizations—this includes a set of responses containing a Yes/No and/or Approval/Denial-type response;

Release of Data—this is a response which includes Response Data, multiple Response Data may be packaged together and sent to a requester. This Response Type may be referred to as a Level Request.

As a non-limiting example, with user and TSDB and/or TSE approval, the user and/or a third party may request that along with, or instead of, the data being transferred a "confirmation response" communication be sent. The confirmation response may include, for example, Actual Data, Token, User Universal ID, Derivative, Multiple Unique Derivative ID, and/or Electronic/Digital Issuance Certificate ID as well as a simple Yes or No, or Approval or Denial indication (or binary equivalents such as '0' or '1'). In certain embodiments, the confirmation response only includes a Yes/No or Approval/Denial indication. Additionally, a Level Request may optionally be included.

As a non-limiting example of a Yes/No or Approval/Denial confirmation response, a Yes/No request and/or confirmation response will not send any user data (e.g., actual data, tokenized data, derivative data, etc.) but rather will only contain a simple Yes or No to a question about user data. As a non-limiting example, a third party data request may be "Verify the user is OLDER than 21 years, YES OR NO." The confirmation response sent to the third party will not send the user's actual birth date, but rather the confirmation response will only include a "YES" or "NO" response to the question. Similarly, a third party can request an "Approval or Denial" of a requested transaction, such as, but not limited to, a credit card sale. The confirmation response sent to the third party would simply include "APPROVED" or "DENIED".

Another Response Type mentioned above is a Level Request. The TSDB and/or TSE may organize into sets ("level sets") certain data groups. In some cases, these level sets are comprised of data that are, e.g., most requested, user authorized, user defined, etc. Such data may be organized into level sets corresponding to, for example, respective security/permission settings or respective functionality capabilities. A third party can request that a level set of data be sent to the third party when a user connects and approves the data transfer with the third party. This approval can be accomplished on a mobile device, website, terminal, POS (point of sale) device, electronic device, etc.

TANGO SECURE ENVIRONMENT ("TSE")

The hardware makeup, data, intelligent system, and process flows/stored procedures are included in the TSE. In some embodiments, the TSE includes:

Tango Secure Database ("TSDB")—In certain embodiments, the TSDB is a collection of databases which contain Identifiers of an entity, sometimes referred to herein as a "Tango Profile" for the identified entity. Data is separated by security levels and requires the Tango Intelligent System ("TIS") to properly locate the data.

Tango Intelligence System ("TIS")—In certain embodiments, the TIS is a set of stored procedures and processes which analyze the data and requests received and communicates with the TSDB to retrieve necessary Identifiers to fulfill a response. TIS is responsible for the creation and communication of Response Data. In certain embodiments, Response Data is never stored on the TSDB. The TIS may also take in Identifiers of requesters in order to analyze and approve the requests sent by the requesters. Highest level authentication may require manual approval and will not be proceeded further by the TIS.

The TIS, in certain embodiments, controls and securely stores procedures and user data (via the TSS and/or DSS (discussed below), and in some cases the TSDB) to interact with a user's approved data device (mobile or otherwise) as well as other approved electronic hardware/devices and software/systems, and third parties through the TSDB. These third parties may include, but are not limited to, credit/debit card companies/issuers, banks, mobile apps, government credential-issuing organizations, etc. Moreover, the TIS can create ID/Credentials for users to be used by approved third parties. The TIS does not connect directly to any outside approved or non-approved parties/devices/databases/third parties, etc. Rather, any transaction connecting to TIS, TSS, and/or DSS must interface through the TSDB. This architecture prevents any direct public access to any data stored in the TIS. Thus, the disclosed novel system and method is designed to protect users from identity fraud and security vulnerabilities that are prevalent today and projected to continue to be common in the future.

All data for a user belongs to that user and the user themselves control the transmission of the data. The TIS and/or TSE system does not control the data dissemination, rather the TIS and/or TSE system assists the user to securely employ the user's data as the user directs.

Tango Secure Storage ("TSS")—In certain embodiments, the TSS, which is controlled by the TIS, is a secure data storage device or software module to protect user's information and allow the user and/or owner of the stored information to be the sole controllers of the stored information.

Data Secure Storage ("DSS")—In certain embodiments, the DSS, which is controlled by the TIS, is used separately or in conjunction with the TSS to securely store user/owner data.

Network Connection—In certain embodiments, processes such as, but not limited to, APIs (i.e., application program interfaces) and web services will be utilized from entities connecting to the TSE via a network connection. Requests and the extracted information will be sent to the TSE for processing and confirmation. Higher level authentication will require real-time connection with the TSE.

Firmware—In certain embodiments, entities not utilizing real-time connection and network connection will utilize firmware provided by the TSE Authority to fulfill processing and confirmation. The firmware will utilize stored procedures and Response Data provided by the TSE.

PROVISIONING

Provisioning, as used herein, includes the process of preparing and equipping an apparatus, such as, but not limited to, a secure storage system including a database, to allow the secure storage system to provide information and/or services to a user and/or third party.

The TSE Authority takes steps to provision data and entities. If the data has been successfully verified, it will be marked as so in the TSDB. The TSDB may still store unverified data and this unverified data will be utilized if a requester accepts unverified data.

In certain embodiments, the TSE provisions data in the following ways/scenarios:

Third Party Data Provisioning—In certain embodiments, the TSE will connect manually with third party entities to securely transfer or verify Actual Data. As a non-limiting example, two parties may swap IP addresses to create an exemption in the firewall to maintain connection for authentication of Actual Data.

Hardware Provisioning—In certain embodiments, the TSE creates profiles and Identifiers for unique hardware identification. Hardware from the TSE Authority may contain certificates and Identifiers in the hardware unit itself. Third party hardware such as mobile devices, computers, and terminals will require provisioning from the TSE to input Identifiers into the third party device by utilizing a Certificate Authority. As a non-limiting example, in order to provision a mobile device, the TSE will take in device-specific information from the third party device and create an Identifier/profile on the TSDB. Depending on the level of security needed, a Certificate Authority will input Identifier or Response Data to specific hardware to be utilized in future connections.

Third Party Provisioning Request—In certain embodiments, third party entities may issue a request to the TSE for a creation of an Identifier for a relationship between the TSE entity and the third party. In this instance, the TSE will create the third party specific Identifier and confirm with the entity if it wishes to attach this new Identifier to the entity's existing profile. If accepted, the information will be added to the entity's profile as verified data. If not, the information will be added to the entity's profile as unverified data. As a non-limiting example, a university wishes to create a unique Student ID for a particular TSE user when the user enrolls at the university. The TSE will create a new ID and ask the user if he/she wishes to attach the University Student ID into his/her profile.

User Provisioning Request—In certain embodiments, a user may issue a request to the TSE for creation and/or storage of a third party Identifier. This request may occur via a user device which extracts data from the third party and sends that data to the TSE or the request may consist of the user manually entering third party data and transferring that data to the TSE. If the TSE has a connection method with the third party for data verification, the data will be added to the user's profile as verified data. If not, the data will be added to the user's profile as unverified data. As a non-limiting example, if a user is utilizing an RFID/NFC ("radio frequency identification/near field communication") device, a user's mobile device may pick up passport data and send it to the TSE for storage for future mobile ID usage. As another non-limiting example, if a credit card company does not wish to do over-the-air provisioning of a credit or debit card, the credit card company may provide the user with an activation code. When the user manually enters the activation code with the TSE, e.g., on a TSE website, the activation code will be taken and verified with the credit card issuer and the TSE will provision the associated credit or debit card into the user's profile.

Third Party User Provisions—In certain embodiments, a user may provision a third party device utilizing TSE Identifiers and/or Response Data. This situation may occur via a user device which extracts data from the TSE and sends that data to a third party device. Alternatively, third party user provisioning may include the user manually entering TSE data that was previously inputted to a third party device. The third party device may or may not connect to the TSE for verification (pending security levels). The third party device, however, will maintain the data/credential for future authentication of the user. As a non-limiting example, a user may tap his/her mobile device against an input device (e.g., using NFC communication) when renting a locker. The user's Identifier is sent to the input device for the locker and stored. When the user wishes to open the locker once again, he/she may tap the mobile device again against the input device thus initiating a verification of the user's Identifier and, if verified, the locker opens. As another non-limiting example, a user enters his/her TSE username/password combination into a computer. The computer then connects with the TSE to verify the user's identity. Once the user' identity is confirmed, the TSE may download to the computer the user's specifications and files for use.

As stated above, provisioning includes the process of preparing and equipping an apparatus to allow it to provide service(s) (e.g., providing and/or verifying and/or authenticating IDs/credentials and/or the user or third parties) to its user. By way of explanation of the provisioning concept as disclosed herein, the following sections use and discuss simple terminology and scenarios. Those of skill in the art will readily understand that the terminology and/or the scenarios are exemplary only and in no way are intended to limit the scope of the disclosure or embodiments discussed.

For purposes of this discussion, the term "Giver" will be used to represent a User (i.e., person or entity for which ID/credential is created and/or stored and/or transmitted, as appropriate) or an apparatus utilized to pass data to a "Receiver", where the apparatus must have a network connection to a secure storage system for user to input and verify an ID/credential. Naturally, a user may have more than one apparatus that operates as a Giver. The term "Receiver" will be used to represent a network-enabled or localized apparatus which receives data from the Giver to validate Giver and/or provide appropriate service(s). The Receiver may have one or more Giver(s) accessed at the same time.

A Giver and Receiver relationship is utilized to describe a transaction of data that has or will take place. Due to the complexity of certain use cases of ID/credentials, there may be multiple transactions taking place in a particular use case. This may cause a user or apparatus to take on both the role of Giver and Receiver during portions of the entirety of a scenario.

Scenario A. Giver provisioning third party networked apparatus.
1. Giver connects with apparatus and passes data
2. Apparatus connects with Server (i.e., at secure storage system)
3. Server verifies data
4. Server (if data is validated) opens session
5. Server connects with apparatus to provide user with access to function allowed while session is open
6. Session can be closed by Server, User (Giver), or apparatus Scenario B. Giver provisioning third party networked Apparatus (when Apparatus lacks network connection or requires Giver to communicate with Server).
1. Giver connects with apparatus and passes data
2. Apparatus does not have network connection or requires Giver to communicate with Server
3. Apparatus connects with Giver (i.e., data device)
4. Giver connects with server
5. Server verifies data
6. Server (if data is validated) opens session
7 Server connects with Giver and passes session info
8. Giver connects with Apparatus to provide user with access to session
9. Session can be closed by Server, User, or Apparatus Scenario C. Giver network provisioning third party Apparatus.
1. Giver connects with Apparatus and passes data
2. Apparatus connects with Giver and passes data
3. Giver connects with Server
4. Server verifies data
5. Server (if data is validated) opens session
6. Server connects with Giver to provide user with access to function allowed while session is open
7. (optional step) Giver connects with Apparatus and passes data
8. Session can be closed by Server or Giver Scenario D. Giver provisioning 3rd party localized apparatus.
1. Giver connects with Apparatus and passes data
2. Apparatus analyze data and opens session with received data
3. Apparatus may store the data given by Giver as temporary data and open session, or
4. Apparatus may utilize permanent master data and open session (key)
5. Session can be closed by Giver or Apparatus A session can be closed, as non-limiting examples, by the User or User's device (whether they are the Giver or Receiver) in the following ways:
1. User can set a time to expire session based on time (clock time, elapsed time, etc.)
2. User can set an instance upon which the session will expire (e.g., key can only be used once)
3. User can manually close session A session can be closed by the Apparatus (Receiver) in the following ways, as non-limiting examples:
1. Apparatus can have a set time upon which the session will expire
2. Apparatus can have an instance upon which the session will expire (i.e. after one time use of function)
3. Apparatus can be manually closed (via a person with, e.g., a Master Override)

A session can be closed by the Server in the following ways, as non-limiting examples:
1. Server can have a set time upon which the session will expire
2. Server can have an instance upon which the session will expire (e.g., after two times of logging in to the Server)
3. Server can be manually closed (via a person with, e.g., a Master Override)

Examples of provisioning use cases are presented below. One of ordinary skill in the art will understand that these examples are offered to aid in understanding of the disclosure and do not limit the scope of the disclosure.

Example 1: User provisioning his/her own mobile device (Scenario A)
1. Giver connects with Apparatus and passes data
2. User enters username, password, PIN, email
3. Apparatus connects with Server
4. Apparatus sends username, password, PIN, email, Apparatus hardware ID, and Requesting Data
5. Server verifies data (TSDB sends request to TIS)
6. TIS verifies username, password, PIN, email, Apparatus hardware ID, Requesting Data, and opens session (if data is validated)
7. Server connects with Apparatus to provide User with access to function allowed while session is open
8. Server passes session token and User role data (i.e. accessible modules)
9. Session can be closed by Server, User, or Apparatus:
a. Server expires session token based on time
b. User manually closes session Example 2: User provisioning their door lock with network connection (Scenario A)
1. Giver connects with Apparatus and passes data
2. Giver passes User ID, Hardware ID, Data (PIN)
3. Apparatus connects with Server
4. Apparatus sends User ID, Hardware ID, Data (PIN), third party ID, App ID (firmware), Terminal ID, Requesting Data
5. Server verifies data (TSDB sends request to TIS)

6. TIS verifies User ID, Hardware ID, Data (PIN), third party ID, App ID (firmware), Terminal ID, Requesting Data and opens session (if data is validated)

7. Server connects with Apparatus to provide User with access to function allowed while session is open 8. Server passes session token and User role data (i.e. accessible modules)

9. Session can be closed by Server, User, or Apparatus:
   a. Server expires session token based on time
   b. User manually closes session
   c. Apparatus expires session token based on instance (when the door closes and door automatically locks)

Example 3: User provisioning a treadmill to contain workout detail (normally Scenario A), however, treadmill loses network connection in order to pull data therefore utilizes User's mobile device as a network relay (Scenario B).

1. Giver (User's mobile device) connects with Apparatus (treadmill) and passes data
2. Giver passes User ID, Hardware ID, Data (PIN)
3. Apparatus does not have network connection
4. Apparatus connects with Giver (device)
5. Treadmill passes User ID, Hardware ID, Data (PIN), third party ID, App ID (firmware), Terminal ID, Requesting Data to User's mobile device
6. Giver (device) connects with Server
7. User's mobile device passes User ID, Hardware ID, Data (PIN), third party ID, App ID (firmware), Terminal ID, Requesting Data to TSDB
8. Server verifies data (TSDB passes request to TIS)
9. TIS verifies User ID, Hardware ID, Data (PIN), third party ID, App ID (firmware), Terminal ID, Requesting Data and opens session (if data is validated)
10. Server connects with Giver (device) and passes session info
11. Server passes session token and data (i.e., workout details in this example)
12. Giver (device) connects with Apparatus to provide User with access to function/data (e.g., session token and workout details) allowed while session is open
13. Session can be closed by Server, User, or Apparatus:
    a. Server expires session token based on time
    b. User manually closes session
    c. Apparatus expires session token based on instance (when the machine is idle for 10 minutes)

Example 4: User goes to hotel where the hotel has the ability to provision the User's mobile device to be utilized as a key to enter into the User's room (Scenario C).

1. Giver (hotel computer) connects with Apparatus (user's mobile device) and passes data
2. Request Data (request for User ID, Hardware ID, Data, and optional credentials (input user name, password, PIN, etc.))
3. Apparatus connects with Giver and passes data
4. Giver passes User ID, Hardware ID, Data, and optional credentials
5. Giver connects with Server
6. Passes User ID, Hardware ID, Data, and optional credentials
7. Server verifies data
8. TSDB passes request to TIS
9. TIS verifies User ID, Hardware ID, Data, and optional credentials and opens session (if data is validated)
10. Server connects with Apparatus to provide User with access to function allowed while session is open
11. (Optional Step) Server connects with Giver (device) and passes session info
12. Server passes session token and data (i.e., door key)
13. Session can be closed by Server or Giver:
    a. Server expires session token based on time
    b. Giver manually closes session (Hotel can manually disable key)
    c. Apparatus expires session token based on instance (when User checks out of the room)

Example 5: User goes to a free public locker and provisions the locker for his/her use (Scenario D).

1. Giver connects with Receiver and passes data
2. Giver passes User ID, Hardware ID, data
3. Apparatus analyzes data and opens session with received data
4. Apparatus will utilize User ID, Hardware ID, data to open session and allow access in future if User ID, Hardware ID, data is given to verify
5. Session can be closed by Giver or Apparatus:
    a. Giver manually closes session (next time User opens and closes the locker)

Example 6: (This is an example where an apparatus may be both the Giver and Receiver and the entire process contains multiple provisioning processes) User has a home management system which controls temperature, TV channel settings, starting the bath water, and changing the security level.

Process A: User connects with Home Management System (Scenario A)

1. Giver (User's mobile device) connects with Apparatus and passes data
2. User enters User ID, Hardware ID, and data (PIN)
3. Apparatus (Home Management System) connects with Server
4. Apparatus sends User ID, Hardware ID, and data (PIN), App ID (firmware), Terminal ID, and Requesting Data
5. Server verifies data (TSDB sends request to TIS)
6. TIS verifies User ID, Hardware ID, and data (PIN), App ID (firmware), Terminal ID, and Requesting Data and opens session (if data is validated)
7. Server connects with Apparatus to provide User with access to function allowed while session is open
8. Server passes session token and User role data (i.e. accessible modules)
9. Session can be closed by Server, User, or Apparatus:
    a. User manually closes session (when exiting the premises)

Process B: Home Management System connects with all connected hardware to enter User's desired presets (Scenario D)

10. Giver (Home Management System) connects with Receiver (Home Climate Control) and passes data
11. Giver passes App ID (firmware), Terminal ID, data (climate preferences)
12. Receiver stores data and opens session with received data
13. Receiver sets the climate control in the house with the User's preset preferences
14. Session can be closed by Giver:
    a. Giver manually closes session (when Home Management System is notified by User in Process A, step 9)

Payment may be necessary as part of any provisioning process. The provisioning process which includes payment is the same as Scenario A or B where the data sent will include payment information. For the case where user data is sent from one mobile device to another mobile device, e.g., when a User gets a new device, the provisioning process will follow Scenario A where the data referenced in the provisioning process will include, for example, all information from the User's old mobile device. Where a User attempts to gain access to a gym via his/her membership card, the provisioning process follows Scenario A, where the open session will be for the instance of opening the door and session will be closed upon the door shutting. For the case where User A gives User B access to User A's door, this process is another example of a process which contains multiple provisioning methods. User A provisions User B by utilizing Scenario B to create a temporary key for User B. Then User B retrieves this key by following Scenario A. Once User B has the key, accessing the door utilizes the processes of Scenario D.

Payment Processing (with additional requests, i.e., PIN)

Certain processes will require additional information, such as a PIN request, in order to process the transaction. During these scenarios, additional steps are put in place for the Server to request the additional data either from the User directly (on the User's networked device) or to be entered on the Apparatus by the User.

Scenario E: Payment Processing on Terminal with PIN

1. Giver (User Mobile Device) connects with Receiver (Payment Terminal) and passes data1 including User ID, Hardware ID, Payment ID, and Requesting Data, to Receiver 2. Receiver passes data2 via network connection to Server, where data2 includes User ID, Hardware ID, Payment ID, and Requesting Data, 3rd Party ID, App ID (firmware), Terminal ID, and Requesting Data 3. Server verifies data2 (TSDB sends request to TIS)

4. TIS verifies data2, needs additional information (PIN)

Example 1: User (or Apparatus) is purchasing an item through a terminal, such as a point-of-sale terminal. This purchase requires additional verification to be entered, but the terminal in this example does not have a input keypad, therefore User will need to enter PIN on his/her own mobile device.

5. Server requests additional data to Receiver, i.e., Requesting Data (Enter PIN)

6. Receiver requests additional data to Giver (mobile device)

7. User inputs data requested and Giver passes to Receiver

8. Receiver connects with Server

9. Server verifies data (TSDB sends request to TIS)

10. Server (if data is verified) opens session

11. Server connects with Receiver to provide Giver with access to function allowed while session is open 12. Session can only be closed by Server Example 2: User (or Apparatus) is purchasing an item through a terminal. This purchase requires additional verification to be entered on the terminal.

5. Server requests additional data to Receiver, i.e., Requesting Data (Enter PIN)

6. Receiver requests additional data to Giver

7. User inputs data requested on the Receiver

8. Receiver connects with Server

9. Server verifies data (TSDB sends request to TIS)

10. Server (if data is verified) opens session

11. Server connects with Receiver to provide Giver with access to function allowed while session is open 12. Session can only be closed by Server Payment Processing on Website (Mobile and/or Computer-based) with PIN Scenario F: Website will connect with Tango Secure Environment ("TSE") (application or portal)

1. Giver (Website) connects with Server and passes data: third party ID, App ID (firmware), User ID (e.g., username and password of User)

2. Server verifies data (TSDB sends request to TIS)

3. Server (if data is verified) opens session

4. Server connects with Receiver to provide Giver with access to function allowed while session is open 5. Giver (Website) connects with Receiver (TSE) and passes data: Session Token, Terminal ID, and data (item description, amount, etc.)

Scenario G: User will enter data on TSE (application or portal)

1. Giver (User) connects with Receiver (TSE) and passes data1: User ID, Hardware ID, Payment ID, and Requesting Data, to Receiver 2. Receiver passes data2 via network connection to Server: data1, third party ID, App ID (firmware), Terminal ID, and Requesting Data 3. Server verifies data2 (TSDB sends request to TIS)

4. TIS verifies data2, needs additional information (PIN)

5. Server sends request for additional data to Receiver: Requesting Data (Enter PIN)

6. Receiver requests additional data to Giver on TSE application or portal

7. User inputs data requested and data is passed to Receiver

8. Receiver connects with Server

9. Server verifies data (TSDB sends request to TIS)

10. Server (if data is verified) processes payment

11. Server connects with Receiver to provide Giver with confirmation

12. Session can only be closed by Server

With attention drawn to FIG. 1, a block diagram of a secure data/credential storage system 100, the Tango Secure Environment ("TSE") according to an embodiment of the present subject matter is depicted. Shown are various segments of the TSE 100. Block 110 depicts the Tango Secure Database ("TSDB"). One of the functions of the TSDB 110 is to operate as the sole communication interface with all data devices communicating to/from the TSE 100. These data devices include, but are not limited to, mobile devices, websites, terminals, POS devices, electronic devices, mobile apps, computers, databases, network devices, etc. All information going to or coming from the TSE 100 must be routed through the TSDB 110. Block 120 depicts the Tango Intelligence System ("TIS") which, in an embodiment, comprises software. The TIS 120 has no direct public access. Access to the TIS 120 must be cleared and routed through the TSDB 110. Block 130 depicts the Tango Secure Storage ("TSS") which, in certain embodiments, is controlled by the TIS 120. The TSS 130 has no direct public access. Access to the TSS 130 must be cleared and routed through the TSDB 110. Block 140 depicts the Data Secure Storage ("DSS"). In an embodiment, the DSS 140 is an expandable secure storage facility for entities and users requiring secure storage and usage of data/ID/credential services, e.g., if a private secure cloud storage facility is requested. The DSS 140 has no direct public access. Access to the DSS 140 must be cleared and routed through the TSDB 110.

Figure 2:
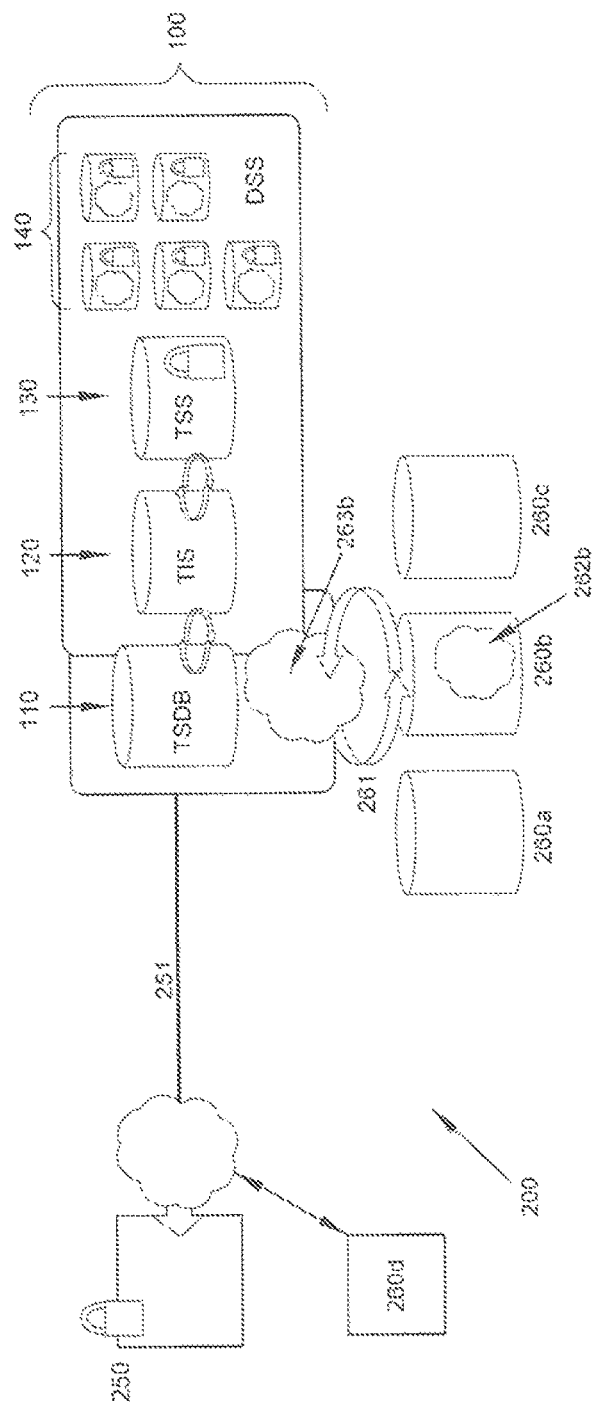
FIG. 2 is a functional block diagram of provisioning an ID/credential system illustrating a process where an ID is created by a third party, stored in a secure storage device, and then sent to a user's device according to an embodiment of the present subject matter.

Considering FIG. 2, a functional block diagram 200 is presented for provisioning an ID/credential system illustrating a process where an ID is created by a third party (such as 260*a*, 260*b*, and/or 260*c*), stored in a secure storage device 100, and then sent 261 to a user's device 250 according to an embodiment of the present subject matter. TSE 100, TSDB 110, TIS 120, TSS 130, and DSS 140 are as described above. The third party 260*b* creates an ID and/or credential 262*b*, which can be pre-existing ID and/or credential data for the user or the user can ask the third party to create ID/credential data on the spot to be sent to the TSE 100. As a non-limiting example, the third party 260b can be a state department of motor vehicles ("DMV") and the ID data 262b can be the user's driver's license information. Continuing with the example, the DMV 260b sends the user's ID data 262b to the TSE 100 via the TSDB 110 through an API (application programming interface) database-to-database communication and/or connection 261. The TSE 100 typically provides the correct communication, technology, and integration needed to connect the third party database 260b to the TSDB 110. The TSDB 110 receives the user's data 263b, passes the user's data to the TIS 120 which may store the user's data in the TSS 130 and/or DSS 140. Alternatively, the TIS 120 may determine that the user's data 263b is not to be stored in which case the TIS creates a procedure to contact the third party database 260b via the API communication and/or connection 261 to check the user's ID every time the user requests it.

The user, via the user's device 250, can access 251 the user's data 262b via an approved mobile application, an approved website, an approved electronic device, an approved computer, and/or an approved database. Here, "approved" indicates that the software/firmware/hardware/device has been given access to connect to the TSDB 110 for or by the user and/or the original creator of the user's ID/credential (which, in this example, is the DMV 260b). In addition, approved third parties 260d may, in place of the user's device 250, access the user's data via the TSDB 110 to verify the user's ID/credentials 263b or 262b, as appropriate. The approved third parties 260d can use the ID/credential access to support various services they may have created. As a non-limiting example, the approved third party 260d may be a door lock manufacturer that created a door lock that only opens upon verification of the user's ID/credentials by connecting to the TSDB 110 via an API running, for example, on the user's mobile device 250. The door lock company 260d can connect to the TSDB 110 via a network connection and performing a real time verification or can have the ID/credential data provisioned on the door lock/device itself.

Figure 3:
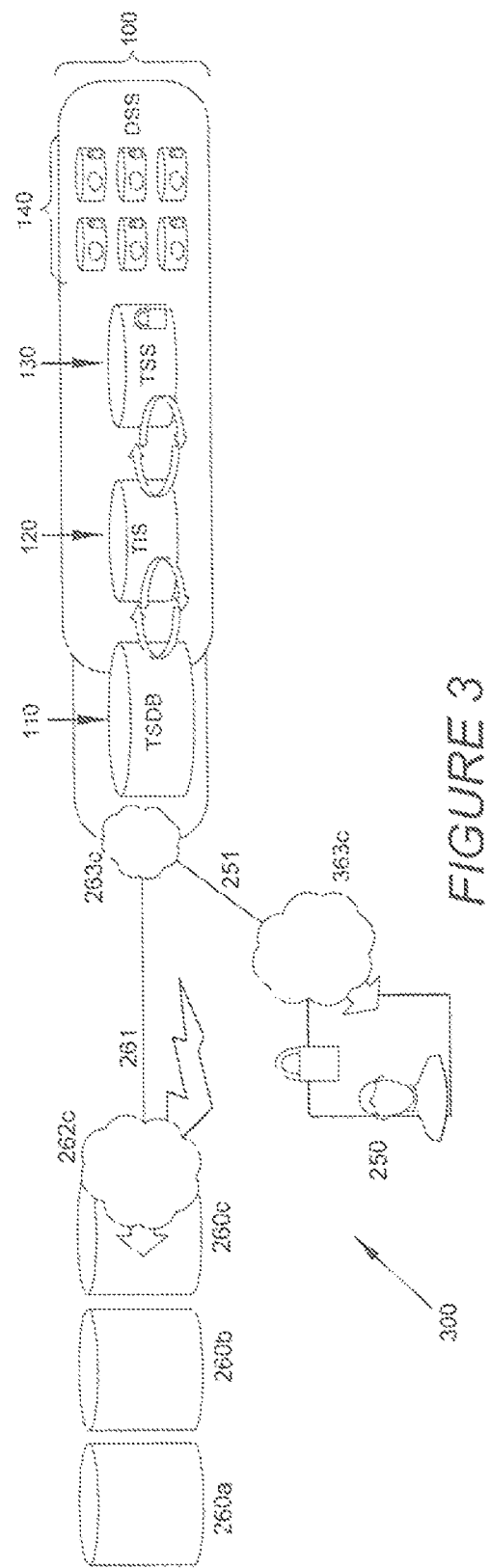
FIG. 3 is a functional block diagram of a process for creating an ID/credential that has been requested for use by a third party by a user or by the third party according to an embodiment of the present subject matter.

FIG. 3 depicts a functional block diagram 300 of a process for creating an ID/credential 262c that has been requested for use by a third party 260c (of third parties 260a, 260b, and 260c) by a user 250 or by the third party 260c according to an embodiment of the present subject matter. TSE 100, TSDB 110, TIS 120, TSS 130, and DSS 140 are as described above. Here, the TSE 100 creates and stores for the user 250 the user's ID/credential 263c on the TSS 130 and/or DSS 140. The ID/credential may have been created for the user based on a request 251 from, e.g., third party 260c such as a university, bank, employer, etc., associated with the user. The user's ID/credential 262c is based on information about the user known by the third party 260c. The third party 260c has access to the TSDB 110 and will be approved by the user for such a connection and for a request associated with the user's ID/credentials. In an embodiment, the TSDB 110 need not send 251 a digital or electronic ID/credential to the user's device 250 if not needed to connect to the third party 260c. In an embodiment, the TSDB 110 may only send 251 a notification to the user/user's device 250 to inform the user of the link with the third party 260c. In another embodiment, the connection between the third party 260c and the TSE 100 may require information 363c on user's device 250 in order to complete the information exchange with the third party 260c.

Figure 4:
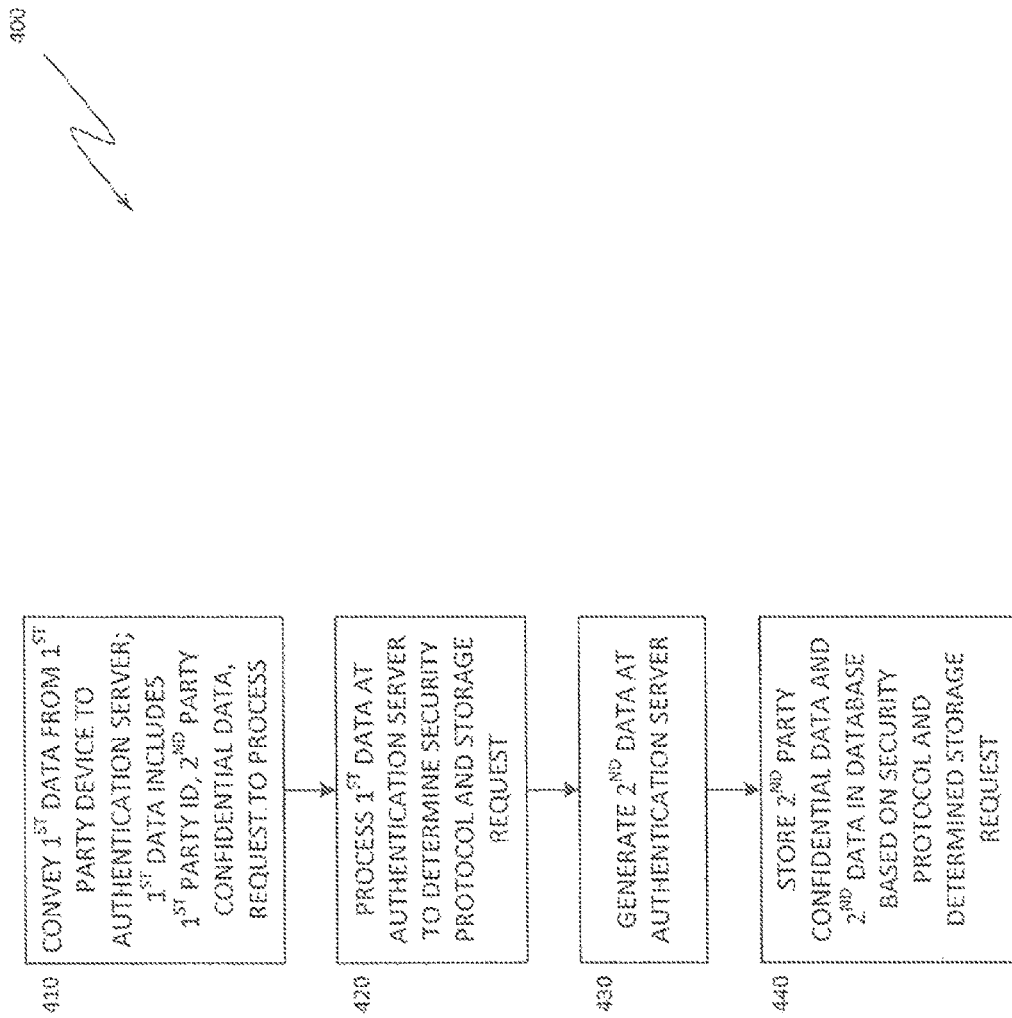
FIG. 4 is a flow chart for a method for provisioning an authentication system according to an embodiment of the present subject matter.

FIG. 4 represents a flow chart 400 for a method of provisioning an authentication system according to an embodiment of the present subject matter. At block 410 first data, such as a user's ID/credential data 262b in FIG. 2, is wirelessly conveyed from a data device of a first entity, such as third party 260b in FIG. 2, to an authentication server, such as TSE 100 via a TSDB 110 in FIG. 2. In an embodiment, the first data 262b includes a first entity identifier (which, in an embodiment, may be data indicating a state DMV), a confidential data item of a second entity, such as user 250 in FIG. 2 (which, in an embodiment, may be driver's license information for the user), and a request to process the confidential data item. In an embodiment, the confidential data item is generated at a data device of the first entity 260b. At block 420, the method includes processing the first data at, e.g., TSE 120 in FIG. 2, to determine that a security protocol is associated with the confidential data item and determine that the request to process the confidential data item is a storage request. At block 430, the method includes generating second data at the authentication server 100 where the second data is generated by operating on the confidential data item with a one-way function. In an embodiment, the one-way function is a hash function, as is known in the art. At block 440, based on the determined security protocol and the determined storage request, the confidential data item and the second data are stored at a database, such as TSS 130 and/or DSS 140 in FIG. 2.

Figure 5:
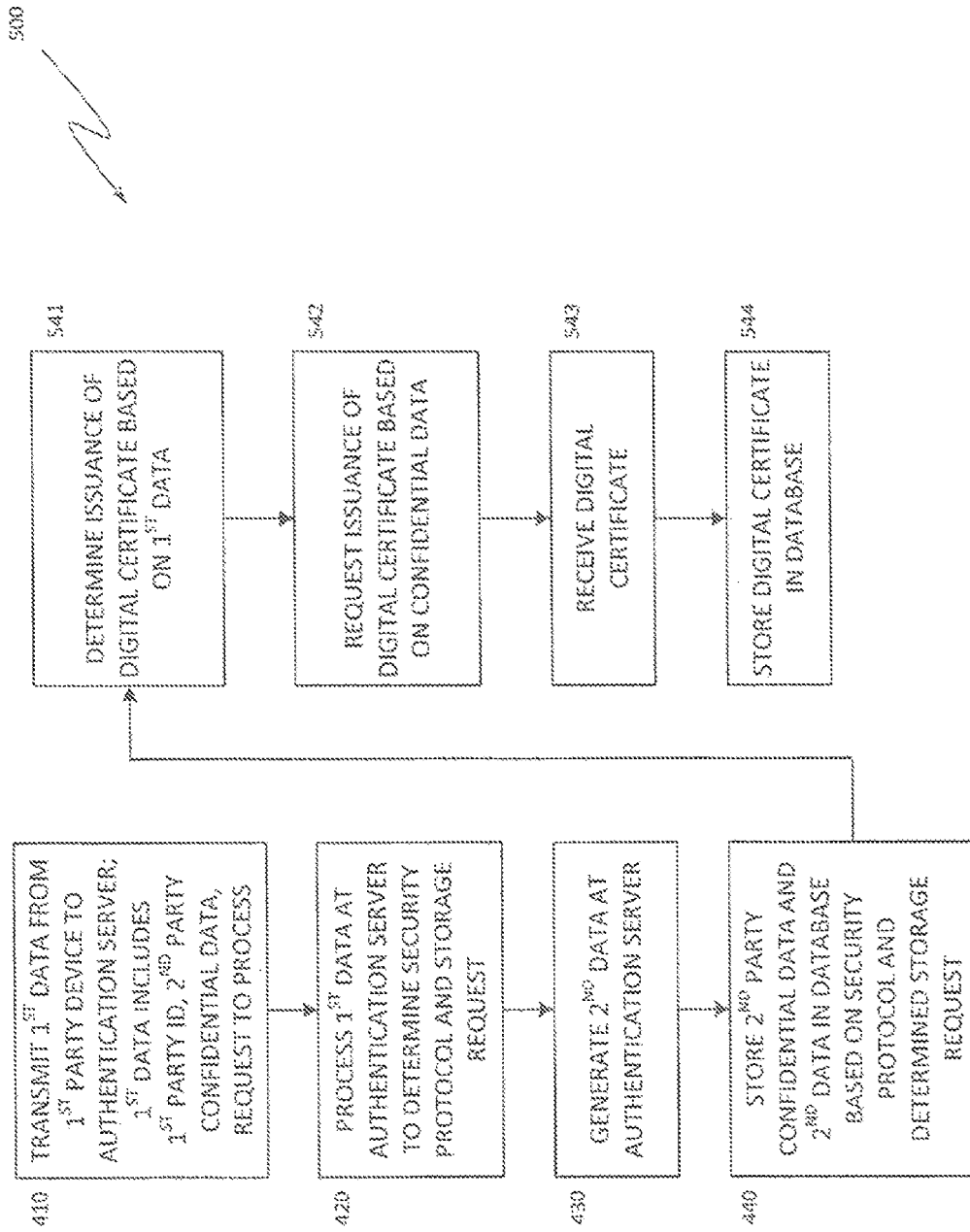
FIG. 5 is a flow chart for a method for provisioning an authentication system including requesting a digital certificate according to another embodiment of the present subject matter.

Turning now to FIG. 5, a flow chart 500 is shown for a method for provisioning an authentication system including requesting a digital certificate according to another embodiment of the present subject matter. Blocks 410, 420, 430, and 440 are as described above with respect to FIG. 4. At block 541, the method includes determining, based on first data, such as a user's ID/credential data 262b in FIG. 2, that a digital certificate is to be issued. At block 542, the method includes requesting issuance of a digital certificate based on at least the confidential data item of the first data, as discussed above. At block 543, the digital certificate is received by, in an embodiment, the TSE 100. At block 544, the digital certificate is stored at a database, such as TSS 130 and/or DSS 140. In an embodiment, the digital certificate is generated by operating with a one-way function on data associated with the issuer of the digital certificate, the confidential data item, a timestamp, and an indication of whether the first entity (e.g., a third party 260b in FIG. 2) or the user requested the issuance of the digital certificate.

Figure 6:
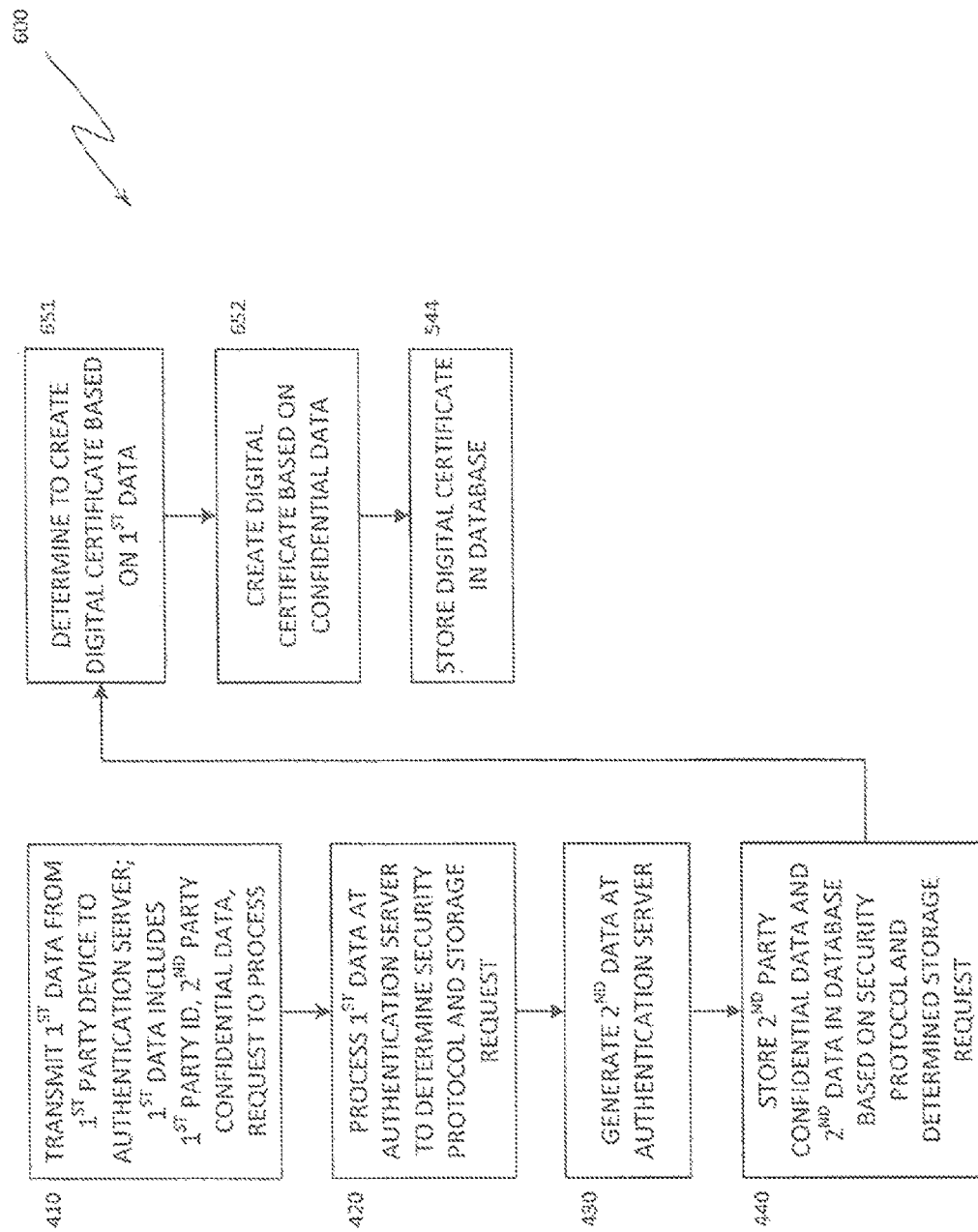
FIG. 6 is a flow chart for a method for provisioning an authentication system including creating a digital certificate according to yet another embodiment of the present subject matter.

FIG. 6 shows a flow chart 600 for a method for provisioning an authentication system including creating a digital certificate according to yet another embodiment of the present subject matter. Blocks 410, 420, 430, and 440 are as described above with respect to FIG. 4. At block 651, the method includes determining, based on the first data, that a digital certificate is to be created. At block 652, a digital certificate is created based on at least the confidential data item. At block 653, the digital certificate is stored at the database, such as TSS 130 and/or DSS 140, as discussed above.

Figure 7:
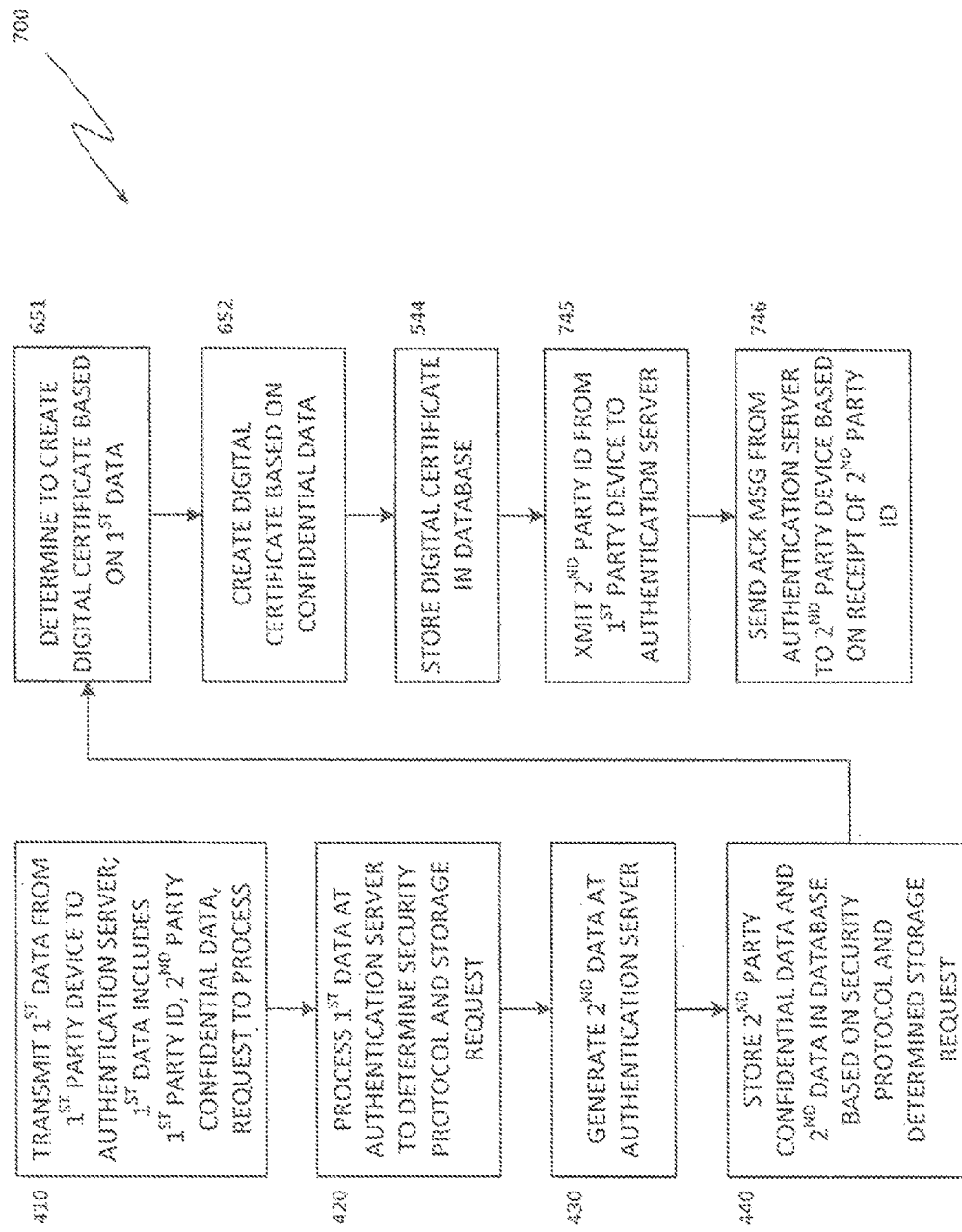
FIG. 7 is a flow chart for a method for provisioning an authentication system including sending an acknowledgement of the provisioning according to still another embodiment of the present subject matter.

Shown in FIG. 7 is a flow chart 700 for a method for provisioning an authentication system including sending an acknowledgement of the provisioning to the user according to still another embodiment of the present subject matter. Blocks 410, 420, 430, and 440 are as described above with respect to FIG. 4. Blocks 651 and 652 are as described above with respect to FIG. 6. Block 544 is as described above with respect to FIG. 5. At block 745, an identifier of the user (e.g., user's ID and/or credential) is transmitted from a data device of the first entity (e.g., a third party 260b in FIG. 2) to the authentication server, such as TSE 100. At block 746, based on receipt of the identifier of the user, acknowledgement message is sent from the authentication server 100 to a data device of the user, such as device 250 in FIG. 2. The acknowledgement message provides a notification that the authentication system 100 has been provisioned for secure storage of the confidential data item. In an embodiment, processing the first data includes comparing the confidential data item against a predetermined list of data items. In another embodiment, the confidential data item and the second data are stored in the user's profile at the database, such as TSS 130 and/or DSS 140.

Figure 8:
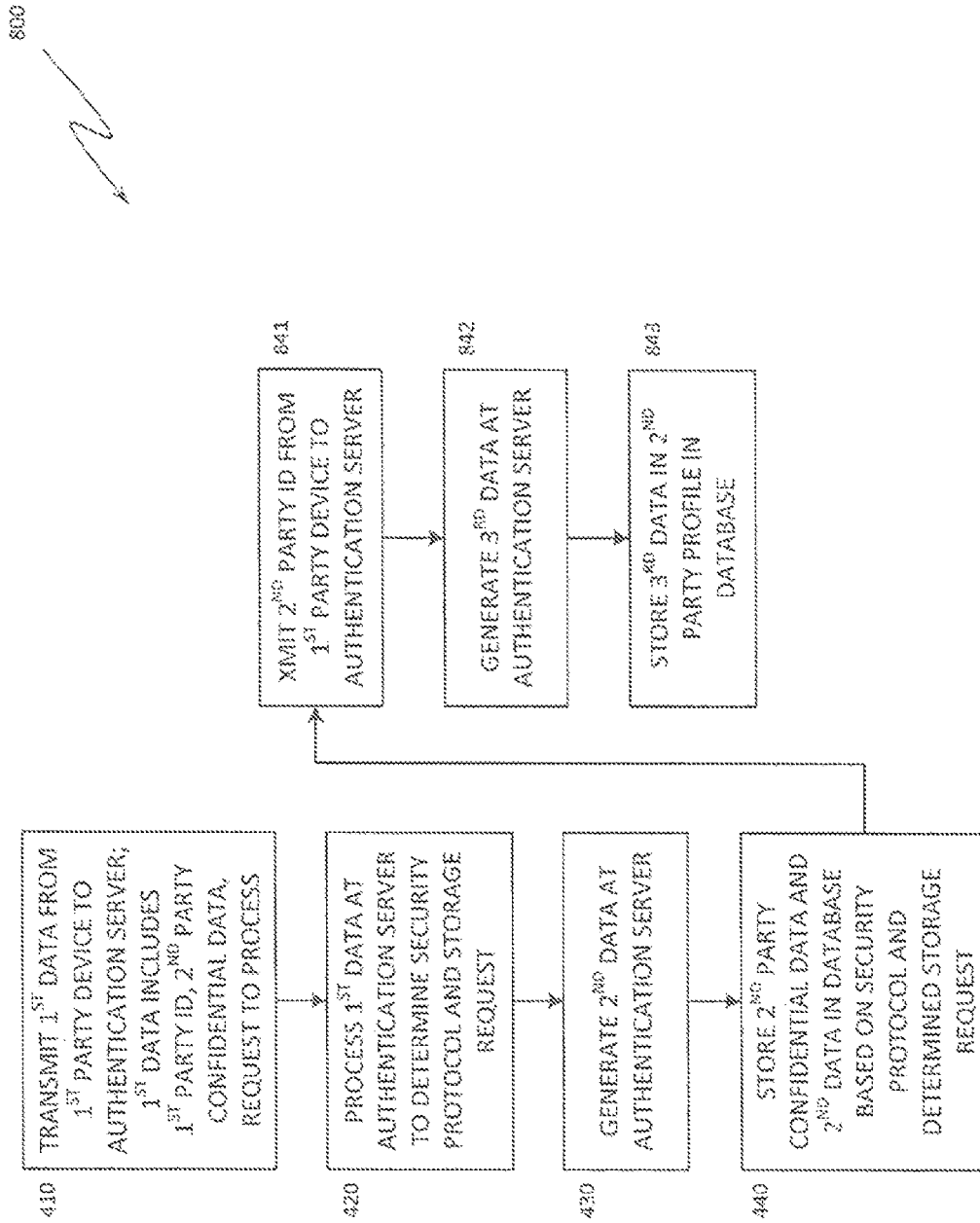
FIG. 8 is a flow chart for a method for provisioning an authentication system including generating additional data using a one-way function according to yet still another embodiment of the present subject matter.

FIG. 8 illustrates a flow chart 800 for a method for provisioning an authentication system including generating additional data using a one-way function according to yet still another embodiment of the present subject matter. Blocks 410, 420, 430, and 440 are as described above with respect to FIG. 4. At block 841, a user identifier (e.g., user's ID/credential) is transmitted from a data device of the first entity (e.g., a third party 260b in FIG. 2) to the authentication server, such as TSE 100. At block 842, at the authentication server 100, third data is generated where the third data is a result of operating on the confidential data item and the user identifier with a one-way function, such as a hash function. At block 843, the third data is stored in the user's profile at the database, such as TSS 130 and/or DSS 140. In an embodiment, the user's profile includes a data table (or similar indexable data structure) indexed by the user's identifier. In another embodiment, the confidential data item and the second data are stored in a first entity's profile at the database. In a further embodiment, the first entity profile includes a data table indexed by the first entity's identifier, as discussed above.

Figure 9:
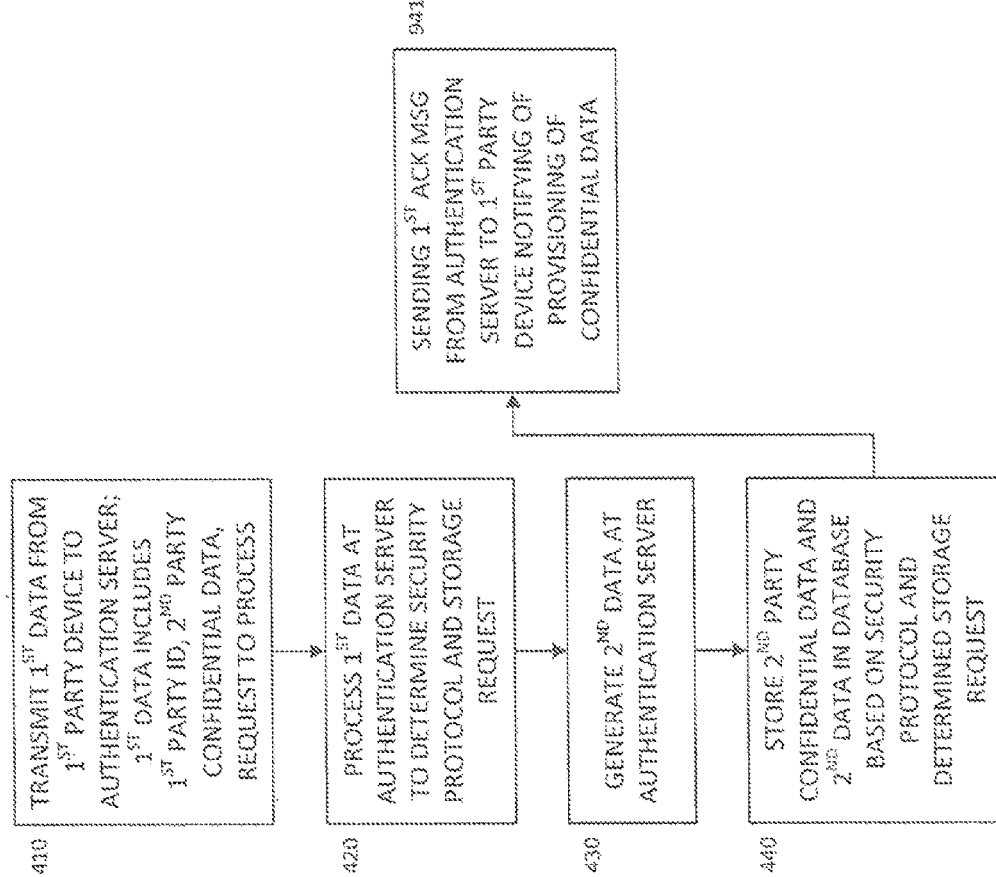
FIG. 9 is a flow chart for a method for provisioning an authentication system including sending an acknowledgement of the provisioning according to a further embodiment of the present subject matter.

Considering FIG. 9, a flow chart 900 is presented for a method for provisioning an authentication system including sending an acknowledgement of the provisioning to the first entity according to a further embodiment of the present subject matter. Blocks 410, 420, 430, and 440 are as described above with respect to FIG. 4. At block 941, an acknowledgement message is sent from the authentication server, such as TSE 100 in FIG. 2, to a data devices of the first entity, such as third party 260c in FIG. 3, where the acknowledgement message provides a notification to the third party 260c that the authentication system 100 has been provisioned for secure storage of the confidential data item.

Figure 10:
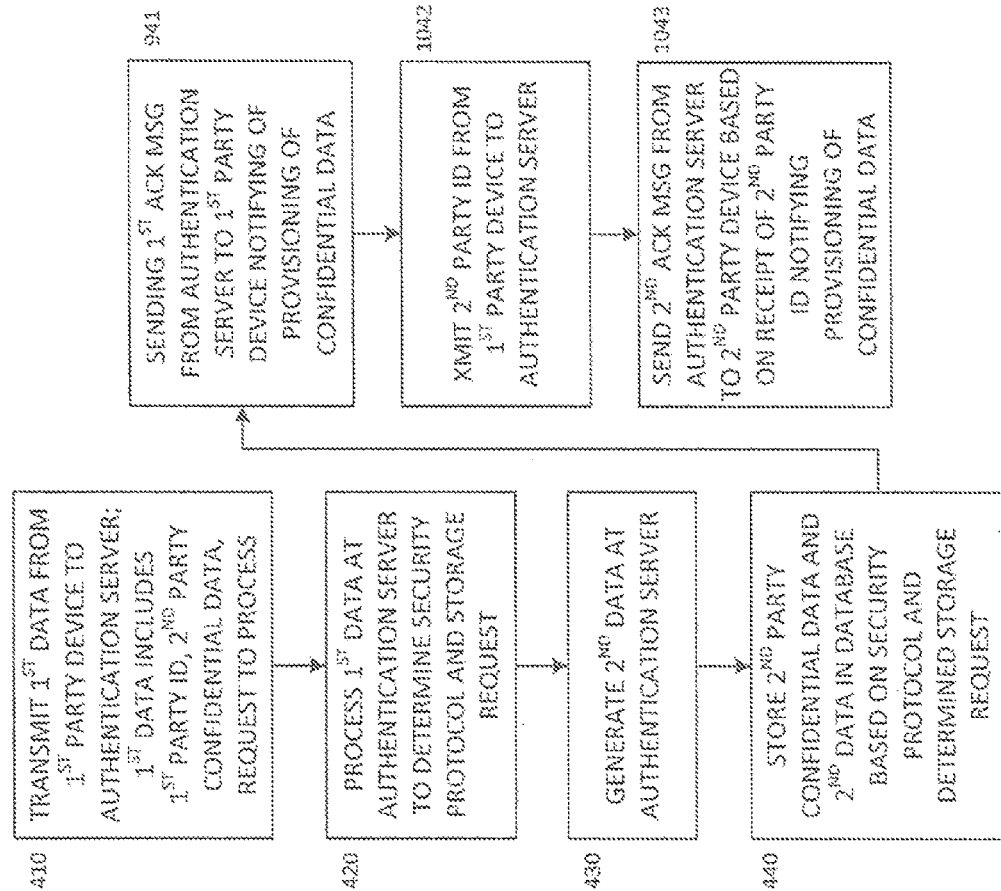
FIG. 10 is a flow chart for a method for provisioning an authentication system including sending a second acknowledgement of the provisioning according to yet a further embodiment of the present subject matter.

FIG. 10 shows a flow chart 1000 for a method for provisioning an authentication system including sending a first and a second acknowledgement of the provisioning according to yet a further embodiment of the present subject matter. Blocks 410, 420, 430, and 440 are as described above with respect to FIG. 4. Block 941 is as described above with respect to FIG. 9. At block 1042, a user identifier, such as a user ID/credential, is transmitted from the a data device of the first entity, such as third party 260c in FIG. 3, to the authentication server, such as TSE 100 in FIG. 3. At block 1043, based on receipt of the user identifier, a second acknowledgement message is sent from the authentication server 100 to a data device of the user, such as device 250 in FIG. 2, where the second acknowledgement message provides a notification to the user that the authentication system 100 has been provisioned for secure storage of the confidential data item.

Figure 11:
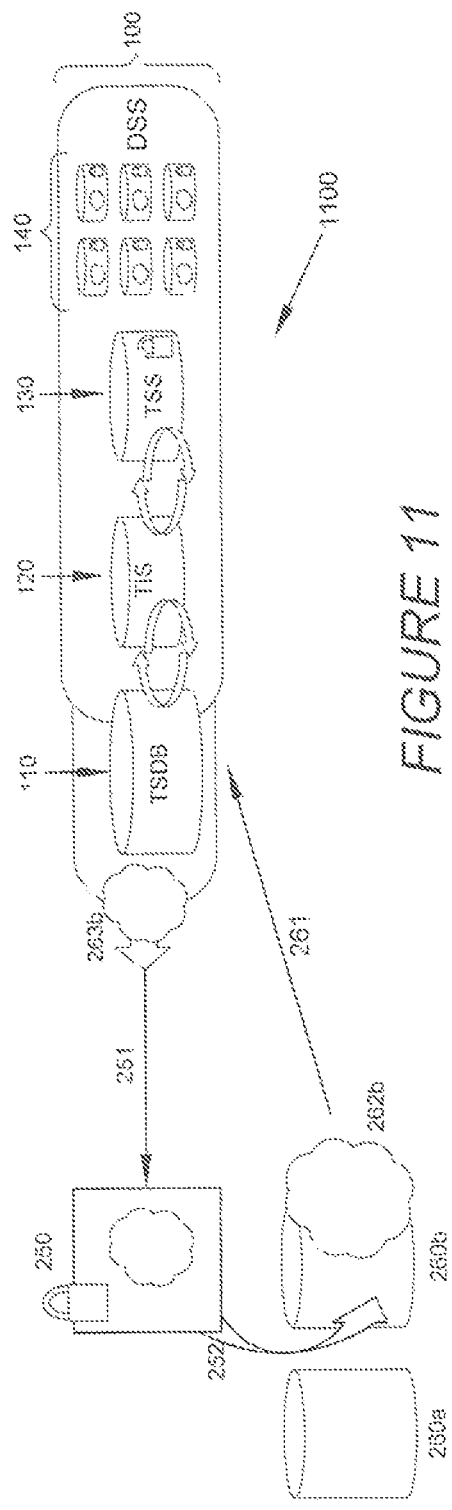
FIG. 11 is a functional block diagram of an ID/credential system illustrating provisioning a third party device using a user's approved data device with the ID/credential system according to still a further embodiment of the present subject matter.

Turning to FIG. 11, a functional block diagram 1100 is shown illustrating an ID/credential system illustrating provisioning a third party device 260b using a user's approved data device 250 with the ID/credential system according to still a further embodiment of the present subject matter. TSE 100, TSDB 110, TIS 120, TSS 130, and DSS 140 are as described above with respect to FIG. 2. Third parties 260a, and 260b, and user/user's device 250 are as described above with respect to FIG. 2. As a non-limiting example of the type of provisioning depicted in FIG. 11, the process of provisioning the third party 260b begins by the user communicating 252 with the third party device 260b (e.g., POS (point of sale) terminal, computer system, mobile device/software/firmware/hardware, website, apps, etc.) via a communication pathway such as, but not limited to, near-field communication, electronic communication, optical communication, radio communication, etc. Upon receiving the communication from the user, the third party device 260b sends a provisioning request 261 (e.g., by using one or more of the communication pathways mentioned above) to the TSE 100 via the TSDB 110. The TSDB 110 will then send to the third party device 260b, via communication 251 to the user's device 250 and then to the third party device 260b via communication 252, any data, such as user ID/credentials 263b discussed above, needed to provision the third party device, as requested by the third party and approved by the user 250. If the user approves the third party to save the data from the TSDB, the third party device will store the user's ID/credentials 262b. Thus, this provisioning may allow, for example, the user 250 to access products and/or services offered by the third party 260b without the third party having to access the TSDB 110 for the user's ID/credentials 263b every time the user attempts to access the third party's products and/or services. In an embodiment, the provisioning of the third party device 260b may be for a predetermined amount of time and/or a predetermined number of access events.

As a non-limiting example of the above procedure, for a low priority/low security event, such as the user renting a locker at an athletic facility, the user provisions the third party locker device with a low security token associated with the user so that the user may open and store his possessions in the locker. The user may then later return to the locker and open the locker with the low security token without having to wait for the third party locker device to contact the TSDB 110 to retrieve the user's ID/credentials.

As a non-limiting example of a high priority/high security event, such as passing a security checkpoint that requires the user's driver's license number, the user's driver's license number will initially be stored in the TSE 100. The user, when at the security checkpoint, will pull his driver's license number using his device 250 from the TSE 100 via the TSDB 110. The user will then store the driver's license number in a database for the security checkpoint for later identification. The security checkpoint may at some point in time, access the TSE 100 to verify/authenticate the user's driver's license number to ensure that it is valid.

Figure 12:
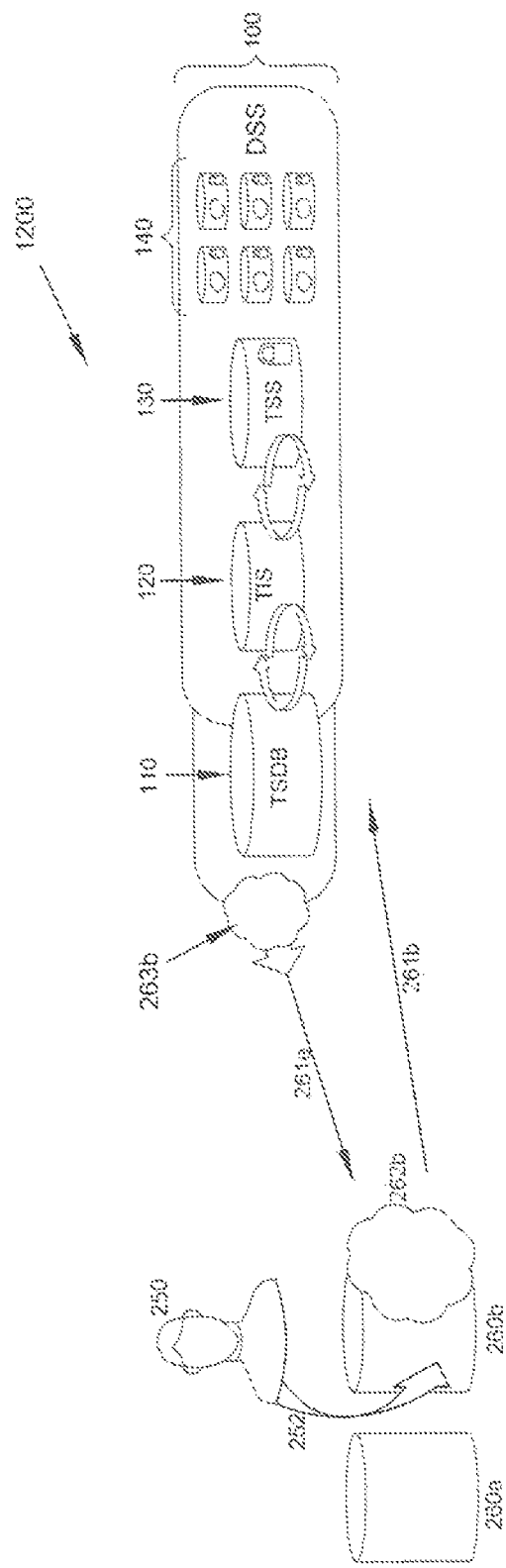
FIG. 12 is a functional block diagram of an ID/credential system illustrating the user provisioning a third party device according to yet still a further embodiment of the present subject matter.

In FIG. 12, a functional block diagram 1200 illustrates an ID/credential system showing the user 250 provisioning a third party device 260b according to yet still a further embodiment of the present subject matter. TSE 100, TSDB 110, TIS 120, TSS 130, and DSS 140 are as described above with respect to FIG. 2. Third parties 260a, and 260b, and user/user's device 250 are as described above with respect to FIG. 2. As a non-limiting example of the type of provisioning depicted in FIG. 12, the process of provisioning the third party 260b begins by the user 250 entering the user's ID/credentials 262b directly into the third party device 260b without the use of the user's device. In this instance, the ID/credentials may be a username/password combination for the user. Once the third party device 260b receives the user's ID/credentials 262b, the third party device may contact 261b the TSE 100 to verify and/or authenticate the username/password entered by the user. This verification and/or authentication may include sending from the third party device 260*b* the user's username/password combination, an identifier for the third party device, and a data request to the TSE 100, via the TSDB 110. The TSE 100 will check the authenticity of the user and the third party device and, if authenticated, will operate on the data request.

As a non-limiting example of the above procedure, for a low priority/low security event, such as using user's public information to prefill a portion of a loan form, the information pertinent to the data request above will be downloaded 261*a* from the TSE 100 to the third party device 260*b* which may include the user's public information such as name, address, and telephone number, for example.

As a non-limiting example of the above procedure, for a high priority/high security event, such as prefilling the loan form with the user's non-public information, e.g., social security number, bank account number, etc., once the authenticity check is completed satisfactorily, the TSE 100 will query the user's device (not shown for clarity) to obtain authorization to release the user's non-public information. The user may then either approve or disapprove the release. If approved, the TSE 100 will download 261*e* to the third party device 260*b* the user's non-public information requested.

Figure 13:
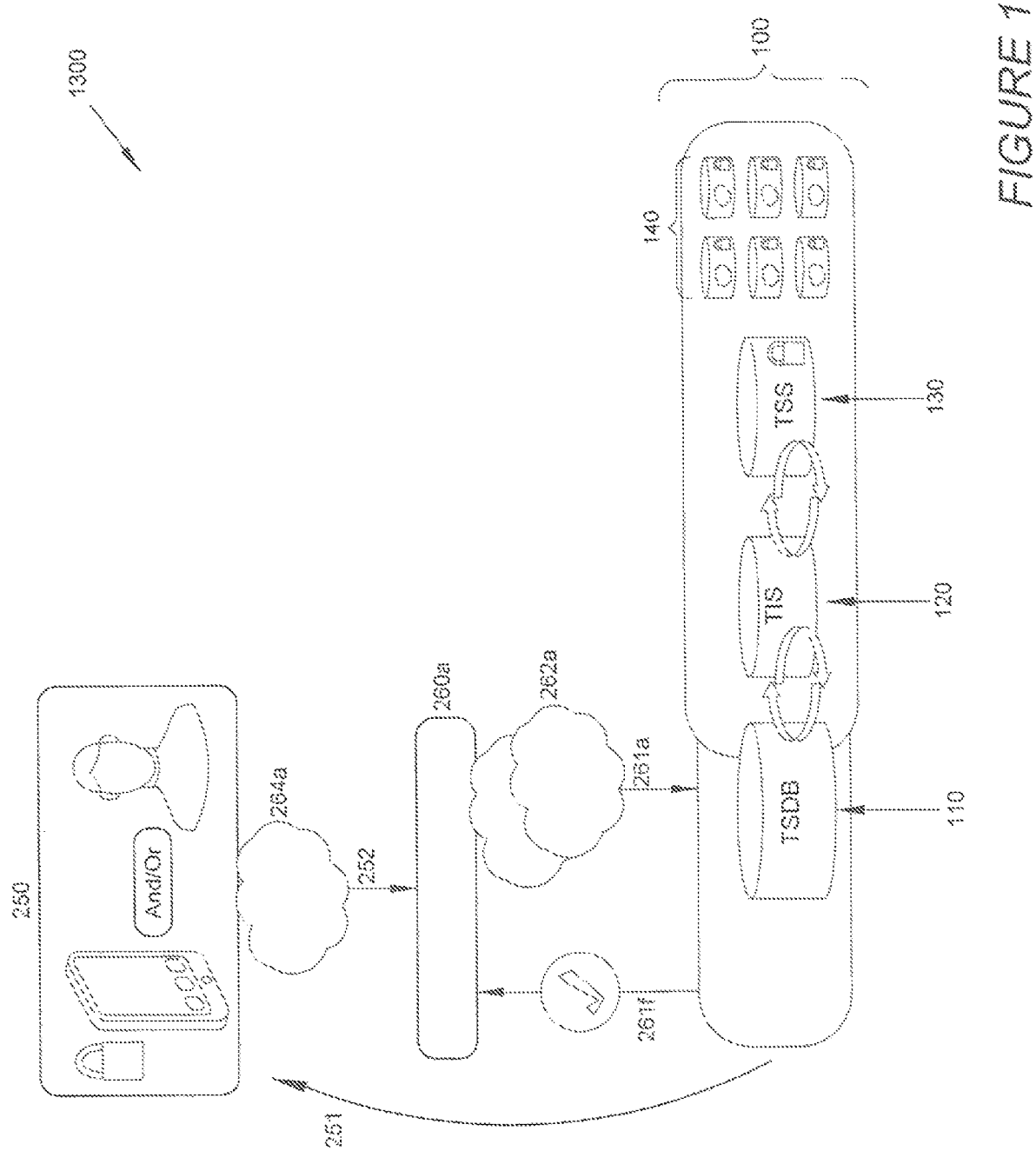
FIG. 13 is a functional block diagram of an ID/credential system illustrating provisioning a third party device according to even a further embodiment of the present subject matter.

Turning to FIG. 13, a functional block diagram 1300 is presented of an ID/credential system illustrating provisioning a third party device according to even a further embodiment of the present subject matter. TSE 100, TSDB 110, TIS 120, TSS 130, and DSS 140 are as described above with respect to FIG. 2. The user 250, either using the user's device or without using the user's device, enters 252 user identification data 264*a* (e.g., PIN, username/password, site key, access code, etc.) into a third party device 260*a*. The third party device 260*a* connects to the TSE 100 via the TSDB 110 and requests provisioning information so that the user and/or the third party device do not have to access the TSE 100 every time the user wishes to use products and/or services of the third party. The third party device 260*a* passes provisioning request 262*a* including the user identification data 264*a* and a third party ID along with instructions regarding the user information to be provisioned. The TSE 100 verifies/authenticates the user identification data and the third party ID and, if required based on the provisioning request, contacts 251 the user and/or user device 250 for authorization. Once authorization is received, if required, the TSE 100 sends 261*f* to the third party device 260*a* the data needed to fulfill the provisioning request. In an embodiment, the TSE 100 will also send to the third party device 260*a* data storage/use procedures for the user to connect to the third party device directly without the need to access the TSE 100.

Figure 14:
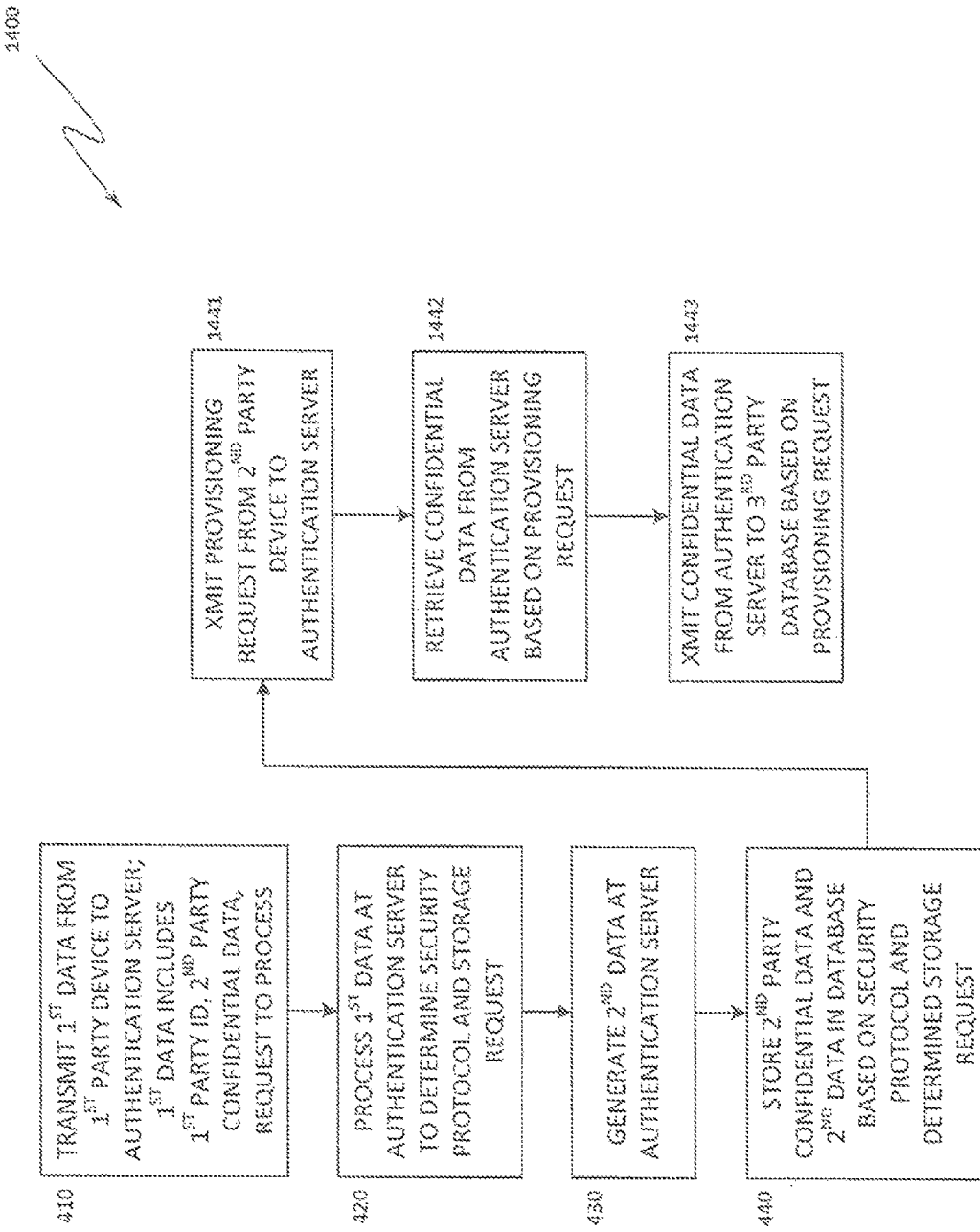
FIG. 14 is a flow chart of a process for provisioning low priority data to a third party database according to yet an even further embodiment of the present subject matter.

FIG. 14 shows a flow chart 1400 of a process for provisioning low priority data to a third party database according to yet an even further embodiment of the present subject matter. Blocks 410, 420, 430, and 440 are as described above with respect to FIG. 4. At block 1441, a provisioning request is transmitted to the authentication server 100 from a user's data device 250. At block 1442, a confidential data item is retrieved from the authentication server 100 based on the provisioning request. At block 1443, the confidential data item is transmitted from the authentication server 100 to a third party database 260*a* based on the provisioning request.

Figure 15:
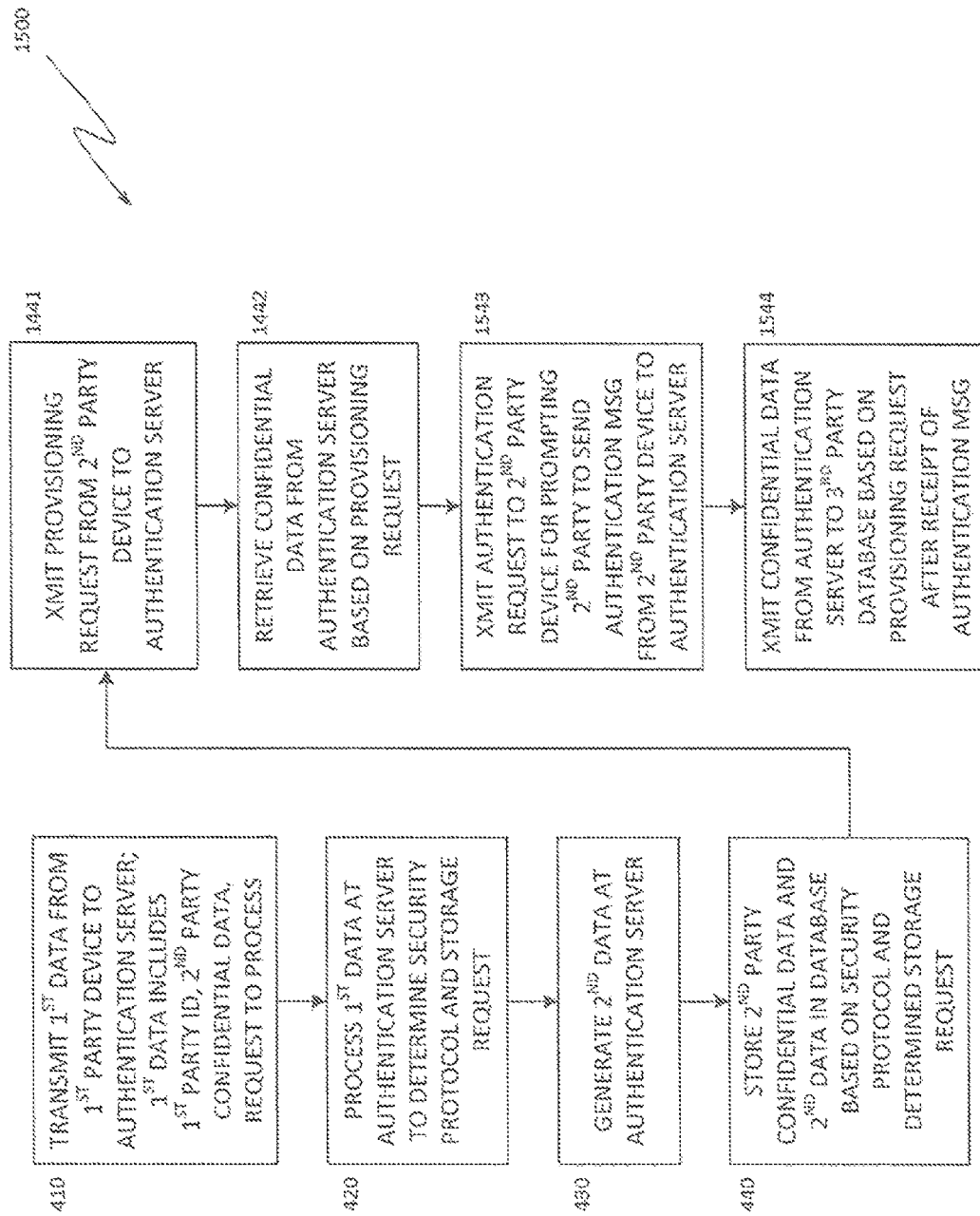
FIG. 15 is a flow chart of a process for provisioning high priority data to a third party database according to still an even further embodiment of the present subject matter.

FIG. 15 displays a flow chart 1500 of a process for provisioning high priority data to a third party database according to still an even further embodiment of the present subject matter. Blocks 410, 420, 430, and 440 are as described above with respect to FIG. 4. Blocks 1441 and 1442 are as described above with respect to FIG. 14. At block 1543, an authentication request is transmitted to the user's data device 250 where the authentication request prompts the user to send an authentication message from the user's data device 250 to the authentication server 100. At block 1544, upon receipt of the authentication message from the user's data device 250, the confidential data item is transmitted from the authentication server 100 to a third party database 260*a* based on the provisioning request.

Figure 16:
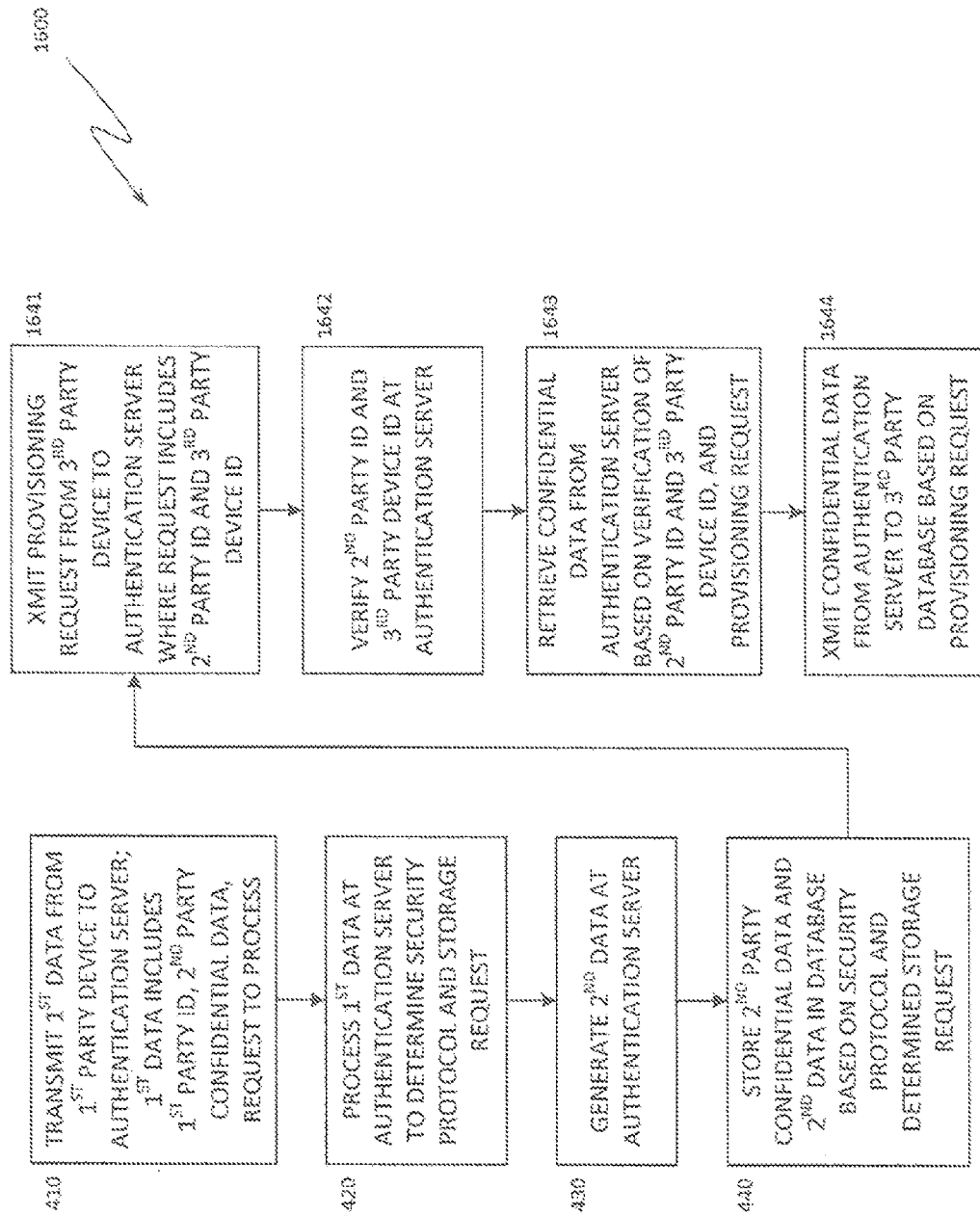
FIG. 16 is a flow chart of a process for a user provisioning low priority data to a third party database according to yet still an even further embodiment of the present subject matter.

FIG. 16 depicts a flow chart 1600 of a process for a user provisioning low priority data to a third party database according to yet still an even further embodiment of the present subject matter. Blocks 410, 420, 430, and 440 are as described above with respect to FIG. 4. At block 1641, a provisioning request is transmitted to the authentication server 100 from a third party's data device 260*a*, where the provisioning request includes a user identifier and a third party data device identification. At block 1642, the authentication server 100 verifies the user identifier and the third party data device identification. At block 1643, a confidential data item is retrieved from the authentication server 100 based on the verification of the user identifier, the verification of the third party data device identification, and the provisioning request. At block 1644, the confidential data item is transmitted from the authentication server 100 to a third party database 260*a* based on the provisioning request.

Figure 17:
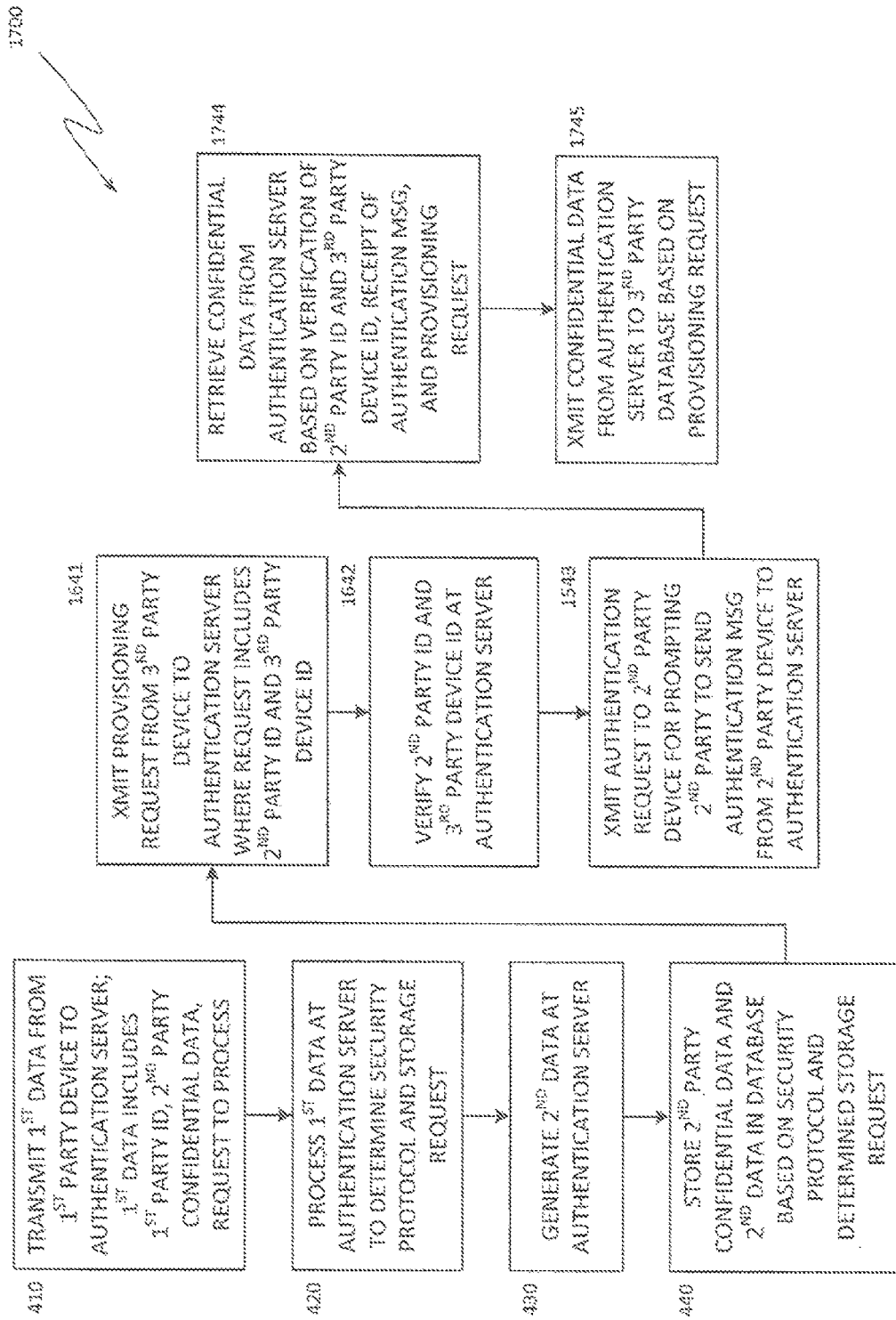
FIG. 17 is a flow chart of a process for a user provisioning high priority data to a third party database according to an embodiment of the present subject matter.

FIG. 17 illustrates a flow chart 1700 of a process for a user provisioning high priority data to a third party database according to an embodiment of the present subject matter. Blocks 410, 420, 430, and 440 are as described above with respect to FIG. 4. Blocks 1641 and 1642 are as described above with respect to FIG. 16. Block 1543 is as described above with respect to FIG. 15. At block 1744, a confidential data item is retrieved from the authentication server 100 based on the verification of the user identifier, the verification of the third party data device identification, the receipt of the authentication message, and the provisioning request. At block 1745, the confidential data item is transmitted from the authentication server 100 to a third party database 260*a* based on the provisioning request.

Figure 18:
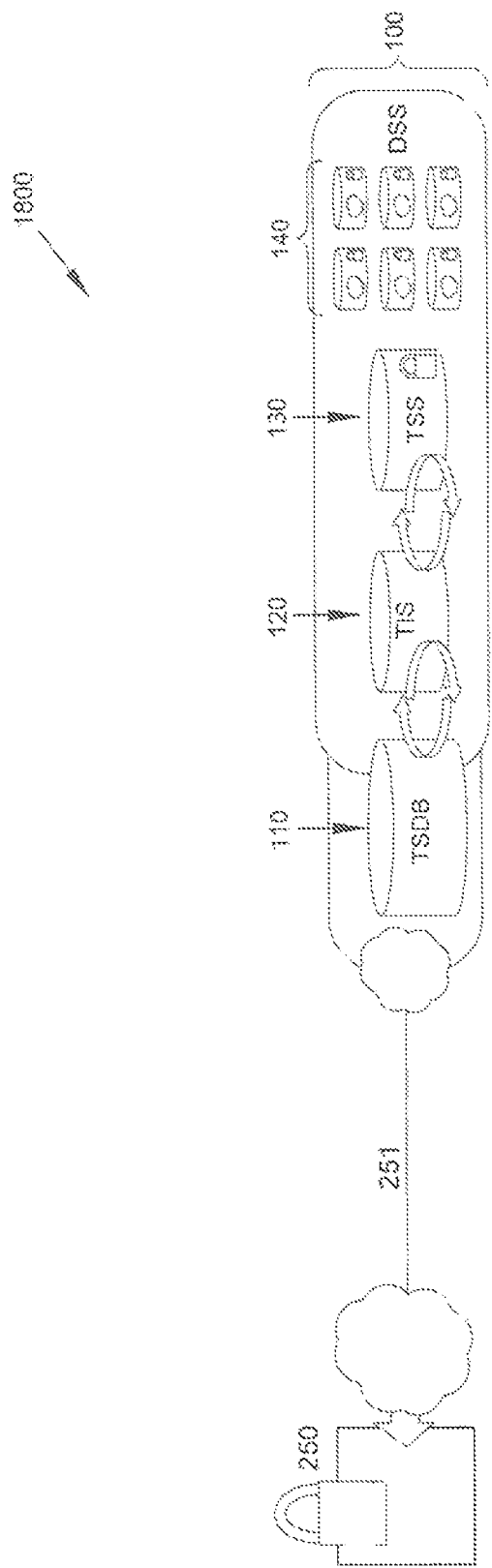
FIG. 18 is a functional block diagram of an ID/credential system illustrating creating an ID/credential and transmitting to a user's data device according to another embodiment of the present subject matter.

FIG. 18 is a functional block diagram of an ID/credential system illustrating the process of creating an ID/credential and transmitting the ID/credential to a user's data device 250 according to another embodiment of the present subject matter. TSE 100, TSDB 110, TIS 120, TSS 130, and DSS 140 are as described above with respect to FIG. 2. The user device 250 is as described above with respect to FIG. 2. Communication between the TSE 100, via the TSDB 110, and the user device 250 is via communication pathway 251, as described above. The TSE 100 can create and/or store for a user the user's ID and/or credentials, as discussed above. The user can then grant access to those third parties that the user authorizes to retrieve a portion or all of the user's data. The user's data may be saved in level sets, i.e., a first group of information may be in a low-level access set, such as the user's publicly-known information. Other information may be in a high-level access set, such as the user's non-publicly-known information such as account numbers, social security number, driver's license number, etc. Additionally, the user may set up a universal ID/credential ("UID") to ease access to multiple third party devices. In an embodiment, the UID is the public information of private and sensitive ID/credential data saved for the user in the TSE 100. The UID can be used by any third party that needs to verify the identity of the user.

In an embodiment, a process for provisioning user data with the TSE 100 includes the user sending a first set of information to the TSE 100 via the TSDB 110. This first set of information includes actual ID/credential data to be stored, for example, the user's driver's license number. Also included, if applicable, is the UID of the user and a provisioning request informing the TSE 100 of how to handle the actual ID/credential data. The TSDB 110 receives the provisioning request and passes it to the TIS 120. The TIS 120 determines the type of actual ID/credential data received from the user, determines if it is secure or non-secure (e.g., public) data, and determines what routines need to be run (e.g., store the actual ID/credential data and/or create a token and/or create derivative data). In an embodiment, the TIS 120 will also create a table (or similar indexable data structure) in the user's storage space in the TSS 130 and/or DSS 140 where the table will include the actual data, a token for the actual data, and a derivative of the actual data. The table may be indexed by PIN, username/password, user ID/credential, access code, etc. The TIS 120 then sends the table to secure storage (TSS 130 and/or DSS 140) for storage in the user's profile. The TIS 120 then sends, via the TSDB 110, an acknowledgement message to the user that the provisioning request has been completed.

Figure 19:
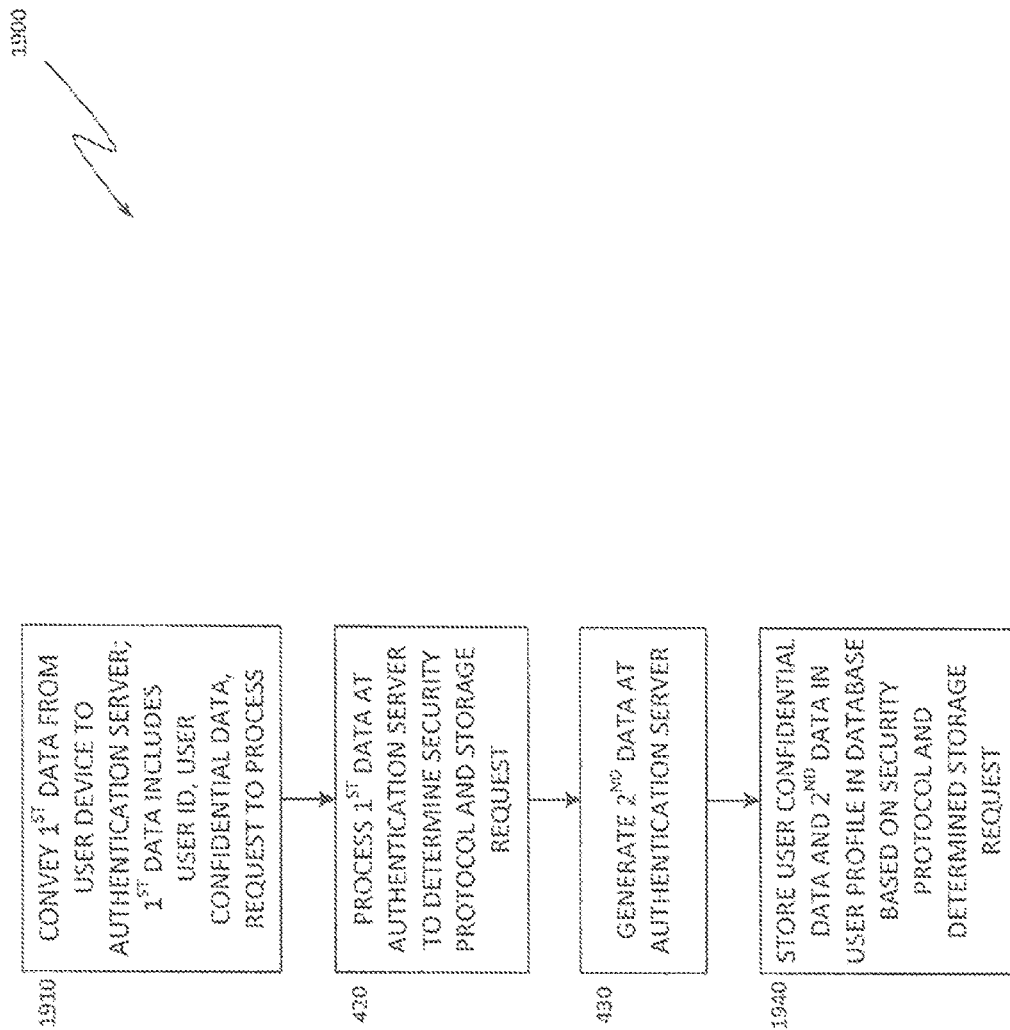
FIG. 19 is a flow chart for a method for provisioning an authentication system including storing a confidential data item in a user's profile of a secure storage device according to yet another embodiment of the present subject matter.

FIG. 19 shows a flow chart 1900 for a method for provisioning an authentication system including storing a confidential data item in a user's profile of a secure storage device according to yet another embodiment of the present subject matter. At block 1910, a first data set is wirelessly conveyed from a user's data device, such as device 250 in FIG. 2, to an authentication server, such as TSE 100 in FIG. 2. In an embodiment, the first data set includes a user identifier, a confidential data item of the user, and a request to process the confidential data item, as discussed above with respect to FIG. 2. In a further embodiment, the first data set further includes a unique transaction identifier corresponding to the request to process the confidential data item. At block 420, at the authentication server 100, the first data set is processed to determine that a security protocol is associated with the confidential data item and to determine that the request is a storage request, as discussed above with respect to FIG. 2. At block 430, at the authentication server 100, a second dataset is generated, where the second data set is a result of operating on the confidential data item with a one-way function, as discussed above with respect to FIG. 2. At block 1940, based on the determined security protocol and the determined storage request, the confidential data item and the second data are stored in a user profile at a database, such as TSS 130 and/or DSS 140.

Figure 20:
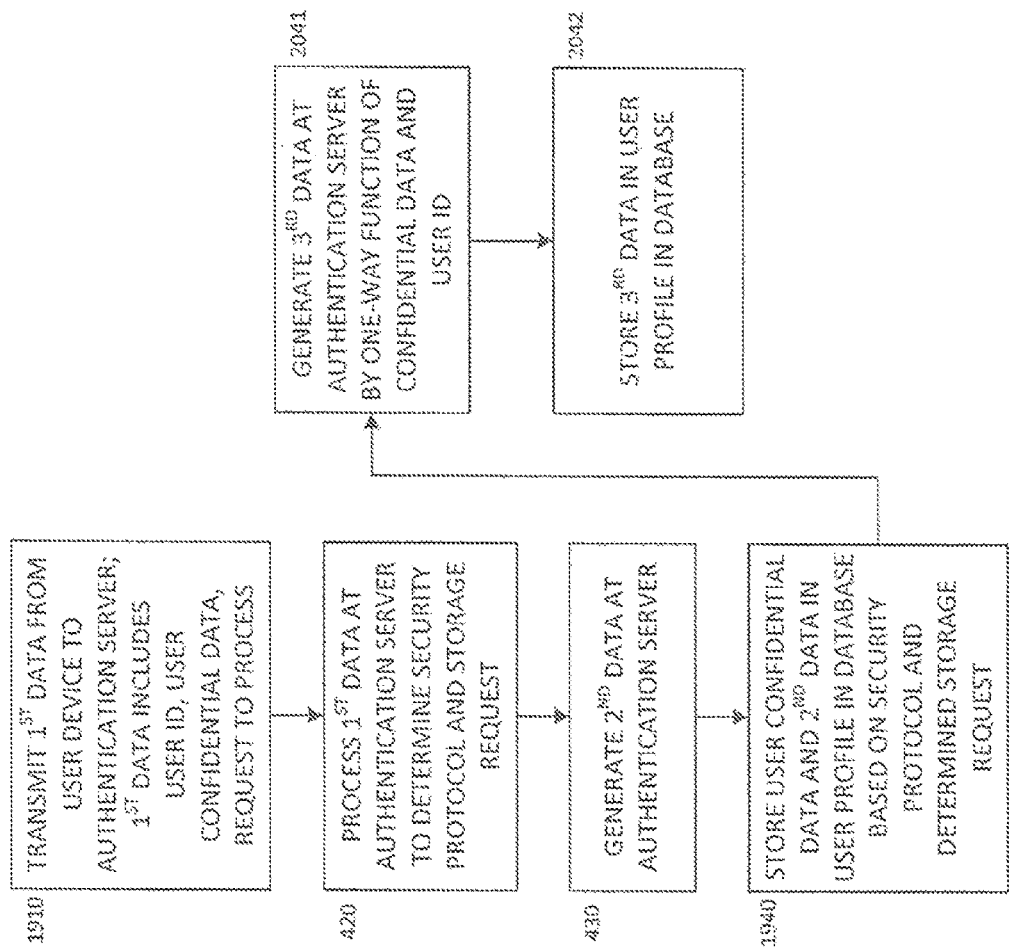
FIG. 20 is a flow chart for a method for provisioning an authentication system including storing a confidential data item in a user's profile of a secure storage device and generating additional data using a one-way function according to still another embodiment of the present subject matter.

FIG. 20 illustrates a flow chart 2000 for a method for provisioning an authentication system including storing a confidential data item in a user's profile of a secure storage device and generating additional data using a one-way function according to still another embodiment of the present subject matter. Blocks 1910, 420, 430, and 1940 are as described above with respect to FIG. 19. At block 2041, at the authentication server 100, a third data set is generated, where the third data set is a result of operating on the confidential data item and the user identifier with a one-way function. At block 2042, the third data set is stored in the user profile at the database TSS 130 and/or DSS 140.

Figure 21:
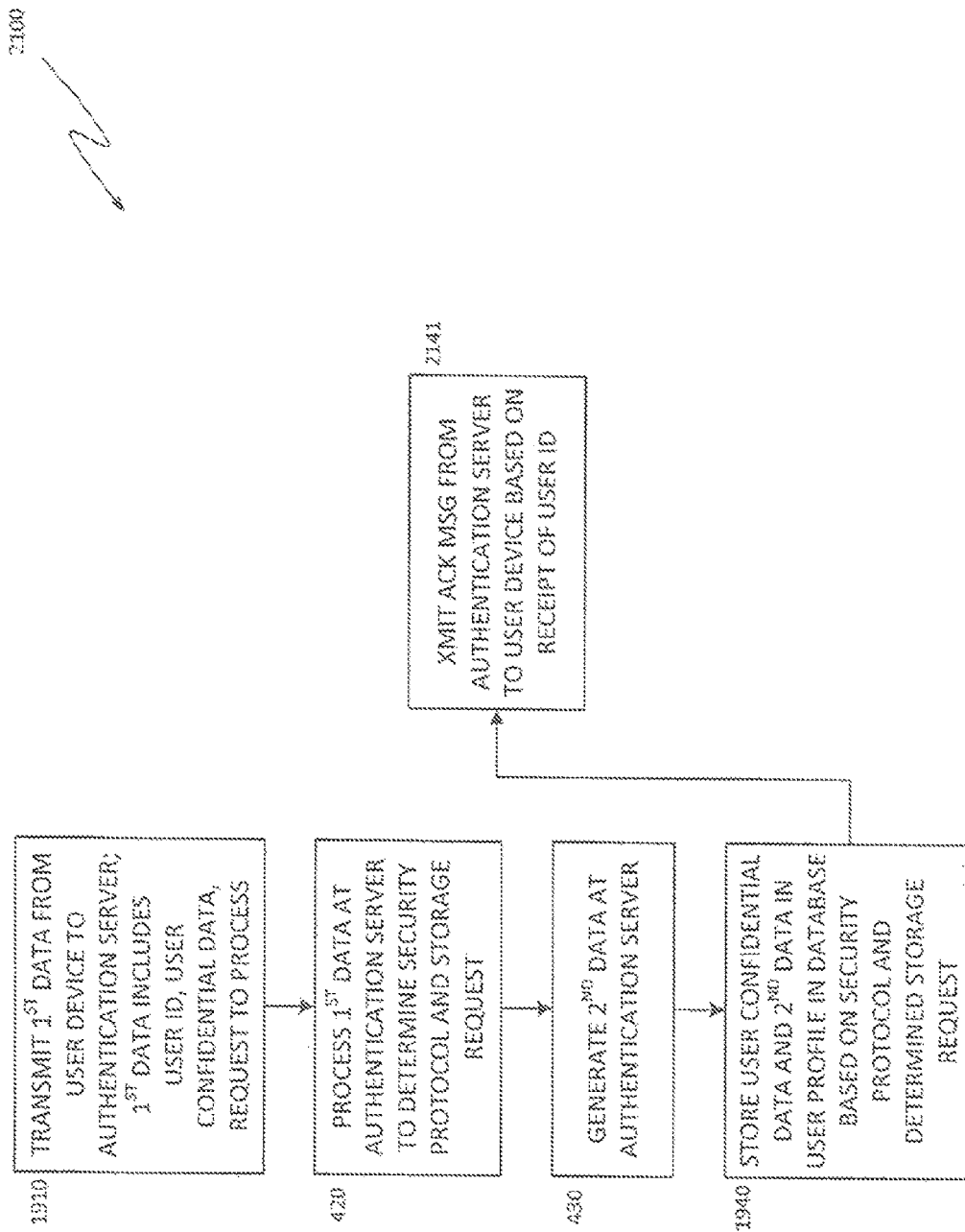
FIG. 21 is a flow chart for a method for provisioning an authentication system including storing a confidential data item in a user's profile of a secure storage device and sending an acknowledgement of the provisioning according to yet still another embodiment of the present subject matter.

FIG. 21 depicts a flow chart 2100 for a method for provisioning an authentication system including storing a confidential data item in a user's profile of a secure storage device and sending an acknowledgement of the provisioning according to yet still another embodiment of the present subject matter. Blocks 1910, 420, 430, and 1940 are as described above with respect to FIG. 19. At block 2141, an acknowledgement message from the authentication server to the user's data device is transmitted based on receipt of the user identifier at the authentication server 100, where the acknowledgement message provides a notification to the user that the authentication system has been provisioned for secure storage of the confidential data item.

Figure 22:
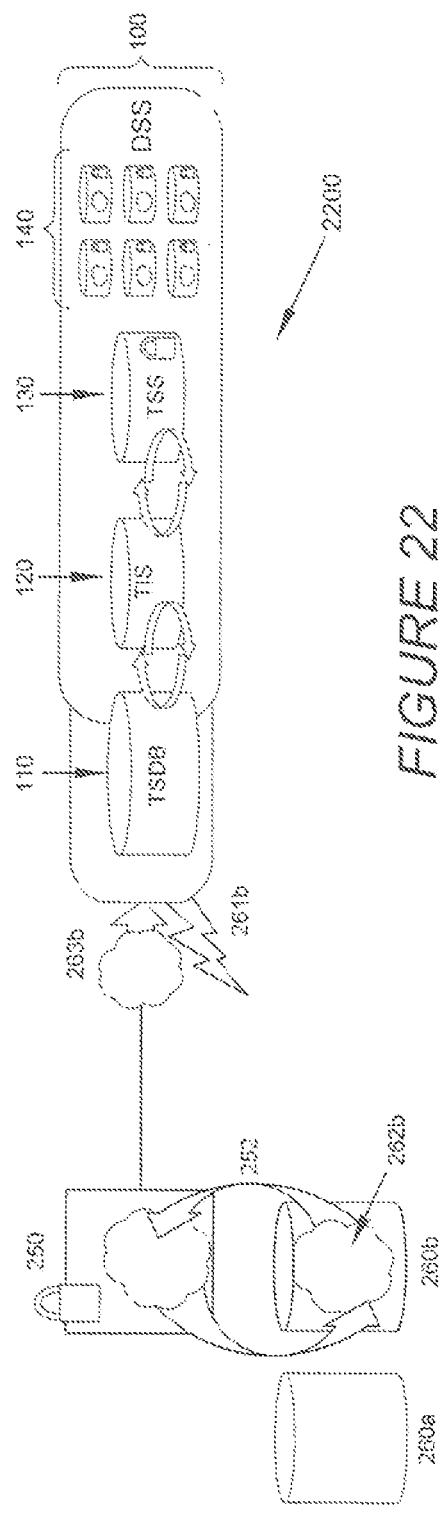
FIG. 22 is a functional block diagram of an ID/credential system illustrating storing in a secure storage device an ID/credential created by a third party according to a further embodiment of the present subject matter.

With attention now drawn to FIG. 22, a functional block diagram 2200 is presented exemplifying an ID/credential system illustrating storing, in a secure storage device, an ID/credential created by a third party according to a further embodiment of the present subject matter. TSE 100, TSDB 110, TIS 120, TSS 130, and DSS 140 are as described above with respect to FIG. 2. Third parties 260*a* and 260*b*, and user/user's device 250 are as described above with respect to FIG. 2. In FIG. 22, the third party device 260*b* creates user ID/credentials 262*b* upon receipt of instructions 252 from the user, either via the user's device 250 or directly from the user into the third party device without use of the user's device. The user then transmits to the TSE 100, via the TSDB 110, from the user's device 250 the ID/credentials 263*b*. The TSDB 110 transfers the ID/credentials to the TIS 120 which determines the handling protocol for the ID/credentials and, in an embodiment, stores the ID/credentials in the TSS 130 and/or DSS 140.

In an embodiment where the third party device 260*b* can connect directly with the TSE 100, the user can instruct the TSE to request the ID/credentials directly from the third party device 260*b*, via communication channel 261*b*. Of course, the third party device 260*b* must be set up with the correct software/firmware/hardware and/or application to communicate with the TSDB 110, as discussed above. Once the TSE 100 has received the ID/credentials, the TIS determines the handling protocol for the ID/credentials and, in an embodiment, stores the ID/credentials in the TSS 130 and/or DSS 140.

Once the ID/credentials 263*b* are stored at the TSE 100, the user will be able to access the ID/credentials from any approved data device, computer, website, application, etc. Additionally, an approved third party that has been granted access by the user may also be able to access the user's ID/credentials 263*b* from any approved third party data device, computer, website, application, etc.

Figure 23:
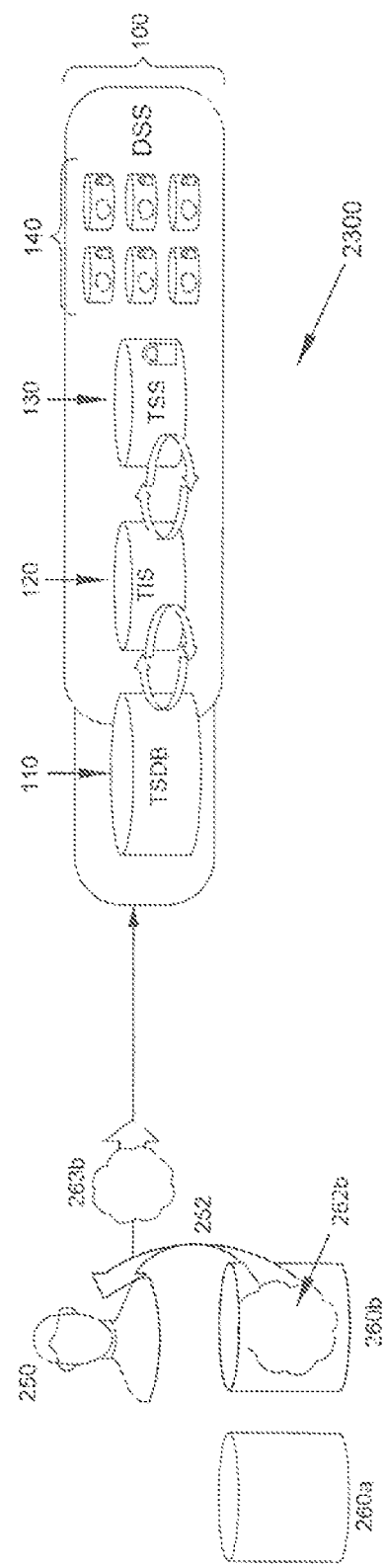
FIG. 23 is a functional block diagram of an ID/credential system illustrating a user manually storing in a secure storage device an ID/credential created by a third party according to yet a further embodiment of the present subject matter.

Considering FIG. 23, a functional block diagram 2300 is depicted for an ID/credential system illustrating a user manually storing in a secure storage device an ID/credential created by a third party according to yet a further embodiment of the present subject matter. TSE 100, TSDB 110, TIS 120, TSS 130, and DSS 140 are as described above with respect to FIG. 2. Third parties 260*a* and 260*b*, and user/user's device 250 are as described above with respect to FIG. 2. In FIG. 23, the third party device 260*b* creates user ID/credentials 262*b* upon receipt of instructions 252 from the user, either via the user's device 250 or directly from the user into the third party device without use of the user's device. The user then manually enters the ID/credential data 263*b* into the TSE 100, such as by manually entering the ID/credential data via a website for the TSE 100.

Figure 24:
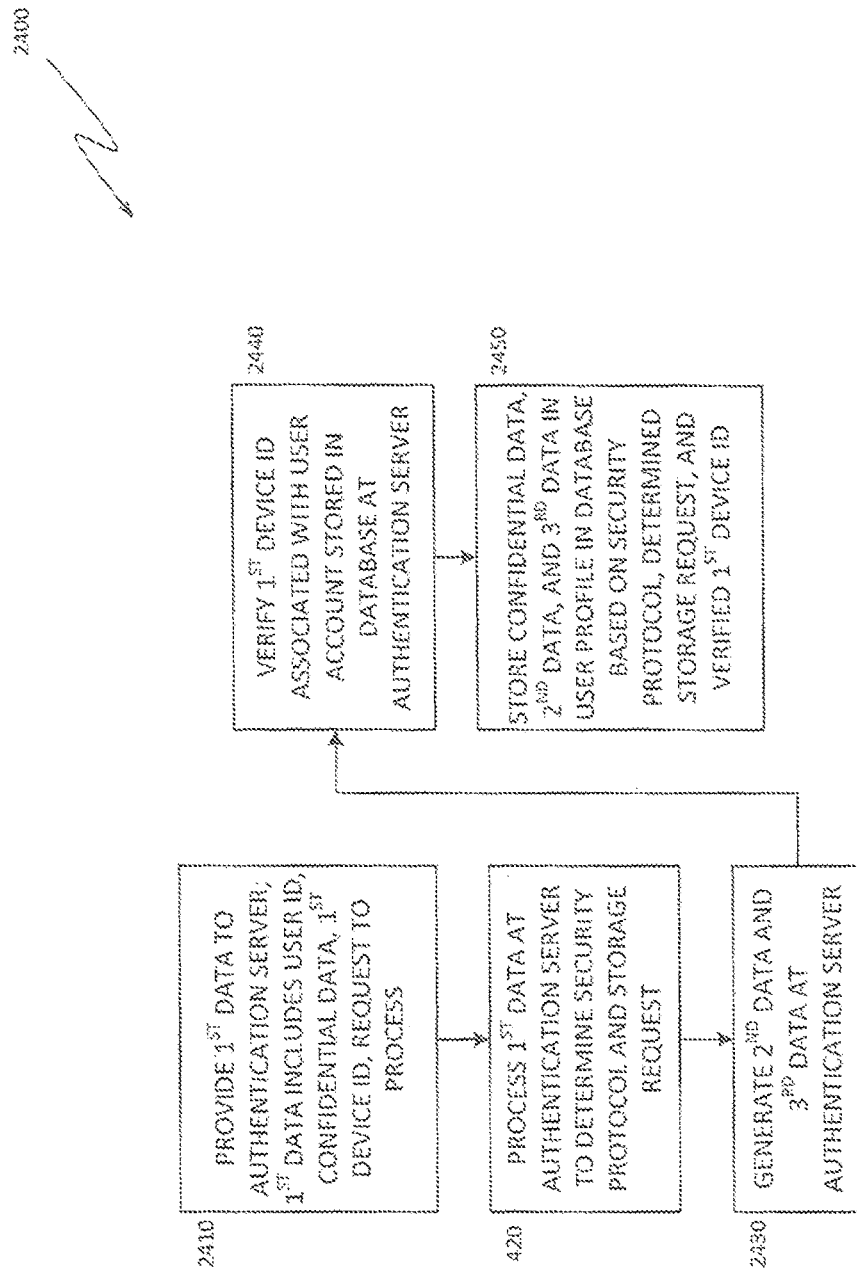
FIG. 24 is a flow chart for a method for provisioning an authentication system according to still a further embodiment of the present subject matter.

FIG. 24 is a representation of a flow chart 2400 for a method for provisioning an authentication system according to still a further embodiment of the present subject matter. At block 2410, a first data set is provided to an authentication server, such as TSE 100, where the first data set includes a user identifier associated with a user, a confidential data item of the user, a device identifier associated with a first device, and a request to process the confidential data item. At block 420, at the authentication server 100, the first data set is processed to determine that a security protocol is associated with the confidential data item and to determine that the request is a storage request. At block 2430, at the authentication server, a second data set and a third data set are generated, where the second data set is generated as a result of operating on the confidential data item with a one-way function, which, in an embodiment, is a hash function, and the third data set is generated as a result of operating on the confidential data item and the user identifier with a one-way function, which, in an embodiment, is a hash function. At block 2440, the device identifier is verified to be associated with an account of the user, where the account is stored in a database at the authentication server 100. At block 2450, based on the determined security protocol, the determined storage request, and the verified device identifier, the confidential data item, the second data, and the third data are stored in a user profile at the database.

In an embodiment, providing the first data set to the authentication server includes wirelessly conveying the first data set from the first device to the authentication server 100. In a further embodiment, providing the first data set to the authentication server includes receiving the confidential data item via manual input from the user at the first device, and transmitting the confidential data item from the second device to the authentication server 100.

Figure 25:
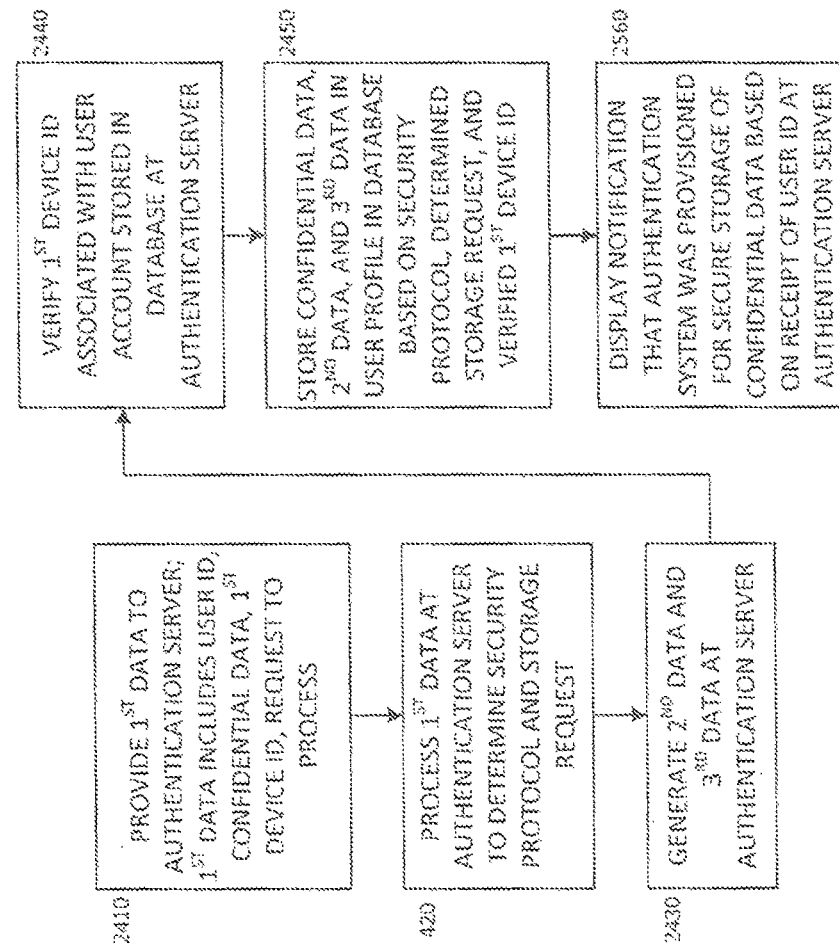
FIG. 25 is a flow chart for a method for provisioning an authentication system including displaying a notification of the provisioning according to yet still a further embodiment of the present subject matter.

FIG. 25 shows a flow chart 2500 for a method for provisioning an authentication system including displaying a notification of the provisioning according to yet still a further embodiment of the present subject matter. Blocks 2410, 420, 1430, 2440, and 2450 are as described above with respect to FIG. 24. At block 2560, based on receipt of the user identifier at the authentication server 100, a notification is displayed indicating that the authentication system has been provisioned for secure storage of the confidential data item.

Figure 26:
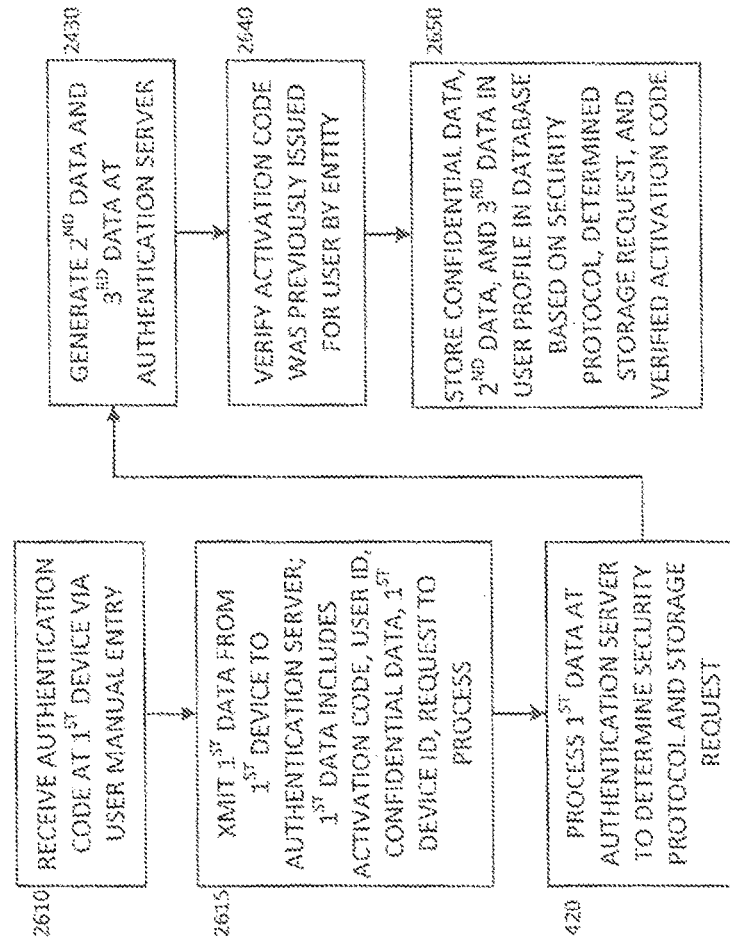
FIG. 26 is a flow chart for a method for provisioning an authentication system including receiving an activation code according to even a further embodiment of the present subject matter.

FIG. 26 presents a flow chart 2600 for a method for provisioning an authentication system including receiving an activation code according to even a further embodiment of the present subject matter. At block 2610, an activation code is received at a first device, such as third party device 260b in FIG. 23, via manual entry by a user. At block 2615, a first data set is transmitted from the first device 260b to an authentication server 100, where the first data set includes the activation code, a user identifier associated with the user, a confidential data item of the user, a device identifier associated with the first device 260b, and a request to process the confidential data item. At block 420, at the authentication server 100, the first data set is processed to determine that a security protocol is associated with the confidential data item and to determine that the request is a storage request, as discussed above. At block 2430, at the authentication server 100, a second data set and a third data set are generated, where the second data set is generated as a result of operating on the confidential data item with a one-way function, such as a hash function, and the third data set is generated as a result of operating on the confidential data item and the user identifier with a one-way function, such as a hash function. At block 2640, the activation code is verified to have been previously issued for the user by an entity. At block 2650, based on the determined security protocol, the determined storage request, and the verified activation code, the confidential data item, the second data, and the third data are stored in a user profile at the database.

Figure 27:
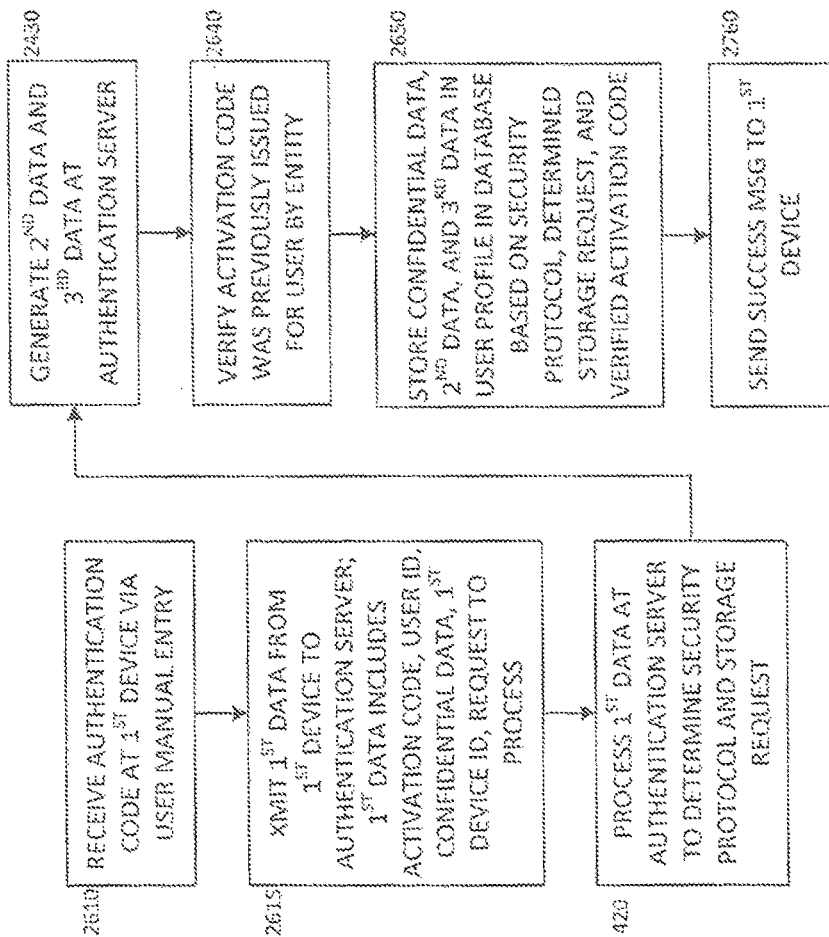
FIG. 27 is a flow chart for a method for provisioning an authentication system including receiving an activation code and sending a success message according to yet even a further embodiment of the present subject matter.

Considering now FIG. 27, a flow chart 2700 is presented for a method for provisioning an authentication system including receiving an activation code and sending a success message according to yet even a further embodiment of the present subject matter. Blocks 2610, 2615, 420, 2430, 2640, and 2650 are as described above with respect to FIG. 26. At block 2760, a success message is sent to the first device to indicate successful provisioning of the confidential data item.

Portions of the present disclosure may be implemented by a general purpose computer programmed in accordance with the principles discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer firmware or hardware, including the structures disclosed in this specification and their structural equivalents, or in combinations of one or more of them. The term "processor" encompasses all apparatus, devices, and machines for processing data, including by way of example a programmable processor, a computer, or multiple processors or computers.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse, trackpad, touchscreen, or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A method of provisioning a credential authentication system, the method comprising:
    wirelessly conveying first data from at least one data device of a first party to an authentication server, the first data including a first party identifier, a confidential data item of a second party, and a request to process the confidential data item, wherein the confidential data item of the second party is generated at the at least one data device of the first party;
    at the authentication server, initiating a session with the at least one data device of the first party and processing the first data that comprises the confidential data item to determine that a security protocol is associated with the confidential data item and determine that the request is a storage request;
    at the authentication server, generating second data, wherein the second data is a result of operating on the confidential data item with a one-way function;
    based on the determined security protocol and the determined storage request, storing the confidential data item and the second data at a database;
    terminating the initiated session in accordance with an expiration factor associated with at least one of the confidential data item and the second data, wherein the expiration factor is selected from the group consisting of: a clock time, a number of requests to access either the confidential data or the second data, and combinations thereof;
    transmitting a provisioning request to the authentication server from a data device of the second party;
    retrieving a confidential data item from the authentication server based on the provisioning request;
    transmitting an authentication request to the data device of the second party, wherein the authentication request prompts the second party to send an authentication message from the data device of the second party to the authentication server; and
    upon receipt of the authentication message from the data device of the second party, transmitting, based on the provisioning request, the retrieved confidential data item from the authentication server to a third party database that is separate from the authentication server.

2. The method of claim 1, further comprising:
    determining, based on the first data, that a digital certificate is to be issued; requesting issuance of a digital certificate based on at least the confidential data item;
    receiving the digital certificate; and
    storing the digital certificate at the database.

3. The method of claim 2, wherein the digital certificate is generated by operating on issuer data, the confidential data item, a timestamp, and an indication of whether the first party or the second party requested the issuance of the digital certificate with a one-way function.

4. The method of claim 1, further comprising:
    determining, based on the first data, that a digital certificate is to be created;
    creating a digital certificate based on at least the confidential data item; and
    storing the digital certificate at the database.

5. The method of claim 4, further comprising:
    transmitting a second party identifier from the at least one data device of the first party to the authentication server; and
    based on receipt of the second party identifier, sending an acknowledgement message from the authentication server to a data device of the second party, wherein the acknowledgement message provides a notification that the authentication system has been provisioned for secure storage of the confidential data item.

6. The method of claim 1, wherein said processing the first data includes comparing the confidential data item against a predetermined list of data items.

7. The method of claim 1, wherein the confidential data item and the second data are stored in a second party profile at the database.

8. The method of claim 7, further comprising:
    transmitting a second party identifier from the at least one data device of the first party to the authentication server;
    at the authentication server, generating third data, wherein the third data is a result of operating on the confidential data item and the second party identifier with a one-way function; and
    storing the third data in the second party profile at the database.

9. The method of claim 8, wherein second party profile includes a data table indexed by the second party identifier.

10. The method of claim 1, wherein the confidential data item and the second data are stored in a first party profile at the database.

11. The method of claim 10, wherein the first party profile includes a data table indexed by the first party identifier.

12. The method of claim 1, further comprising sending a first acknowledgement message from the authentication server to one of the data devices of the first party, wherein the first acknowledgement message provides a notification that the authentication system has been provisioned for secure storage of the confidential data item.

13. The method of claim 12, further comprising:
    transmitting a second party identifier from the at least one data device of the first party to the authentication server; and
    based on receipt of the second party identifier, sending a second acknowledgement message from the authentication server to a data device of the second party, wherein the second acknowledgement message provides a notification that the authentication system has been provisioned for secure storage of the confidential data item.

14. The method of claim 1, further comprising:
transmitting a provisioning request to the authentication server from a third party's data device, wherein the provisioning request includes a second party identifier and a third party data device identification;
verifying at the authentication server the second party identifier and the third party data device identification;
retrieving a confidential data item from the authentication server based on the verification of the second party identifier, the verification of the third party data device identification, and the provisioning request; and
transmitting the confidential data item from the authentication server to a third party database based on the provisioning request.

15. The method of claim 1, further comprising:
transmitting a provisioning request to the authentication server from a data device of a third party, wherein the provisioning request includes a second party identifier and a third party data device identification;
verifying at the authentication server the second party identifier and the third party data device identification;
transmitting an authentication request to a data device of the second party, wherein the authentication request prompts the second party to send an authentication message from the data device of the second party to the authentication server;
retrieving a confidential data item from the authentication server based on the verification of the second party identifier, the verification of the third party data device identification, the receipt of the authentication message, and the provisioning request; and
transmitting the confidential data item from the authentication server to a third party database based on the provisioning request.

16. A method of provisioning a credential authentication system, the method comprising:
wirelessly receiving at an authentication server first data from a data device of a first party, wherein the first data includes a first party identifier, a confidential data item of a second party wherein the confidential data item is associated with one of a plurality of predetermined security protocol levels, and a request to process the confidential data item, wherein the confidential data item of the second party is generated at the at least one data device of the first party;
at the authentication server, initiating a session with the data device of the first party and processing the first data that comprises the confidential data item to determine:
(a) a particular one of the predetermined plurality of security protocol levels is associated with the confidential data item; and
(b) that the request to process is a storage request;
at the authentication server, generating second data, wherein the second data is a result of operating on the confidential data item with a one-way function;
based on the particular one of the determined plurality of security protocol levels and the determined storage request, storing the confidential data item and the second data in a database;
terminating the initiated session in accordance with an expiration factor associated with at least one of the confidential data item and the second data, wherein the expiration factor is selected from the group consisting of: a clock time, a number of requests to access either the confidential data or the second data, and combinations thereof;
transmitting an authentication request to the data device of the second party, wherein the authentication request prompts the second party to send an authentication message from the data device of the second party to the authentication server; and
upon receipt of the authentication message from the data device of the second party, transmitting, based on the provisioning request the retrieved confidential data item from the authentication server to a third party database that is separate from the authentication server;
sending a first acknowledgement message from the authentication server to the data device of the first party, wherein the first acknowledgement message provides a notification that the authentication server has been provisioned for secure storage of the confidential data item;
transmitting a second party identifier from the data device of the first party to the authentication server; and
based on receipt of the second party identifier, sending a second acknowledgement message from the authentication server to a data device of the second party, wherein the second acknowledgement message provides a notification that the authentication server has been provisioned for secure storage of the confidential data item.

* * * * *